US012620008B2

(12) United States Patent
Shukla et al.

(10) Patent No.: US 12,620,008 B2
(45) Date of Patent: May 5, 2026

(54) MACHINE LEARNING TECHNIQUES FOR INTEGRATING DISTINCT CLUSTERING SCHEMES GIVEN TEMPORAL VARIATIONS

(71) Applicant: Optum, Inc., Minnetonka, MN (US)

(72) Inventors: Abhay Shukla, Noida (IN); Deepak Singh, Deoria (IN); Srinjay Nath, Kolkata (IN); Ramprasad Anandam Gaddam, Mumbai (IN)

(73) Assignee: Optum, Inc., Minnetonka, MN (US)

( * ) Notice: Subject to any disclaimer, the term of this patent is extended or adjusted under 35 U.S.C. 154(b) by 985 days.

(21) Appl. No.: 17/657,217

(22) Filed: Mar. 30, 2022

(65) Prior Publication Data

US 2023/0316345 A1     Oct. 5, 2023

(51) Int. Cl.
   *G06Q 30/0282*     (2023.01)
   *G06F 18/23*      (2023.01)
   *G06Q 30/0201*    (2023.01)

(52) U.S. Cl.
   CPC ......... *G06Q 30/0282* (2013.01); *G06F 18/23* (2023.01); *G06Q 30/0201* (2013.01)

(58) Field of Classification Search
   CPC ............................ G06Q 30/0282; G06F 18/23
   See application file for complete search history.

(56) References Cited

U.S. PATENT DOCUMENTS

| 8,452,610 | B2 | 5/2013 | Lipner et al. |
| 9,053,222 | B2 | 6/2015 | Lynn et al. |
| 9,846,896 | B2 | 12/2017 | Shah |
| 10,014,077 | B2 | 7/2018 | Moturu et al. |

(Continued)

FOREIGN PATENT DOCUMENTS

| CA | 3007260 A1 | * | 7/2019 | ........... G06F 16/353 |
| KR | 20210016667 A | * | 5/2021 | |
| WO | 2021/247550 A1 | | 12/2021 | |

OTHER PUBLICATIONS

Zhang et al. (Cold-Start Recommendation Using Bi-Clustering and Fusion for Large-Scale Social Recommender Systems, published 2013) (Year: 2013).*

(Continued)

*Primary Examiner* — David Yi
*Assistant Examiner* — Syed Rayhan Ahmed
(74) *Attorney, Agent, or Firm* — Alston & Bird LLP

(57) ABSTRACT

Various embodiments of the present invention provide methods, apparatus, systems, computing devices, computing entities, and/or the like for performing predictive data analysis operations configured to integrate distinct clustering schemes given temporal variations. For example, certain embodiments of the present invention utilize systems, methods, and computer program products that perform predictive data analysis operations by generating integrative predicted scores based at least in part on at least one of: within-cluster consistency scores determined for clusters determined using a first clustering scheme (e.g., a service clustering scheme), within-cluster consistency scores determined for clusters determined using a second clustering scheme (e.g., a recipient clustering scheme), cross-cluster consistency scores, and cross-temporal consistency scores.

20 Claims, 9 Drawing Sheets

(56) References Cited

U.S. PATENT DOCUMENTS

| | | | |
|---|---|---|---|
| 10,192,639 B2 | 1/2019 | Sellars | |
| 10,325,070 B2 | 6/2019 | Beale et al. | |
| 10,353,908 B1 | 7/2019 | Aella et al. | |
| 10,621,534 B2 | 4/2020 | Ford et al. | |
| 10,672,091 B2 | 6/2020 | Lachs et al. | |
| 10,930,398 B2 | 2/2021 | Jain et al. | |
| 11,099,195 B2 | 8/2021 | Estruch et al. | |
| 11,176,444 B2 | 11/2021 | Wall et al. | |
| 12,315,624 B2 * | 5/2025 | Co | G10L 15/16 |
| 2003/0167187 A1 | 9/2003 | Bua | |
| 2008/0133290 A1 | 6/2008 | Siegrist et al. | |
| 2008/0154641 A1 | 6/2008 | Rulison | |
| 2008/0154642 A1 | 6/2008 | Marble et al. | |
| 2010/0070455 A1 | 3/2010 | Halperin et al. | |
| 2010/0235295 A1 | 9/2010 | Zides et al. | |
| 2014/0122100 A1 | 5/2014 | Fillmore | |
| 2015/0332012 A1 | 11/2015 | Edelson et al. | |
| 2017/0116379 A1 | 4/2017 | Scott et al. | |
| 2017/0177814 A1 | 6/2017 | Abedini et al. | |
| 2017/0308671 A1 | 10/2017 | Bahrami et al. | |
| 2018/0018429 A1 | 1/2018 | Rice | |
| 2018/0068083 A1 | 3/2018 | Cohen et al. | |
| 2020/0066399 A1 | 2/2020 | Springer et al. | |
| 2020/0227160 A1 * | 7/2020 | Youngblood | G16H 40/20 |
| 2021/0005324 A1 * | 1/2021 | Bostic | G16H 50/20 |
| 2021/0082563 A1 * | 3/2021 | Wingfield | G16H 10/60 |
| 2021/0118574 A1 | 4/2021 | Peri et al. | |
| 2021/0249137 A1 | 8/2021 | Dil Nahlieli | |
| 2022/0188698 A1 * | 6/2022 | Halecky | G06Q 30/0613 |
| 2023/0018521 A1 | 1/2023 | Lindy et al. | |
| 2023/0342654 A1 | 10/2023 | Shukla et al. | |

OTHER PUBLICATIONS

"Finding Consistency In Medicare's Quality Ratings For Dialysis Providers," Healio, Nephrology News & Issues, May 11, 2015, (6 pages), available on the Internet: https://www.healio.com/news/nephrology/20180227/finding-consistency-in-medicares-quality-ratings-f.

Levin, Scott et al. "Machine-Learning-Based Hospital Discharge Predictions Can Support Multidisciplinary Rounds and Decrease Hospital Length-of-Stay," BMJ Innovations, vol. 7, No. 2, Apr. 1, 2021, (e-Published: Dec. 21, 2020), pp. 414-421.

Shwartz, Michael et al. "Composite Measures of Health Care Provider Performance A Description of Approaches," The Milbank Quarterly, vol. 93, No. 4, Dec. 2015, pp. 788-825, DOI: 10.1111/1468-0009.12165.

Zhang, Yin et al. "iDoctor: Personalized and Professionalized Medical Recommendations Based On Hybrid Matrix Factorization," Future Generation Computer Systems, vol. 66, Nov. 26, 2015, pp. 30-35, DOI: 10.1016/j.future.2015.12.001.

Non-Final Rejection Mailed on May 19, 2025 for U.S. Appl. No. 17/660,697, 35 page(s).

Advisory Action (PTOL-303) Mailed on Dec. 22, 2025 for U.S. Appl. No. 17/660,697, 3 page(s).

Final Rejection Mailed on Oct. 8, 2025 for U.S. Appl. No. 17/660,697, 38 page(s).

* cited by examiner

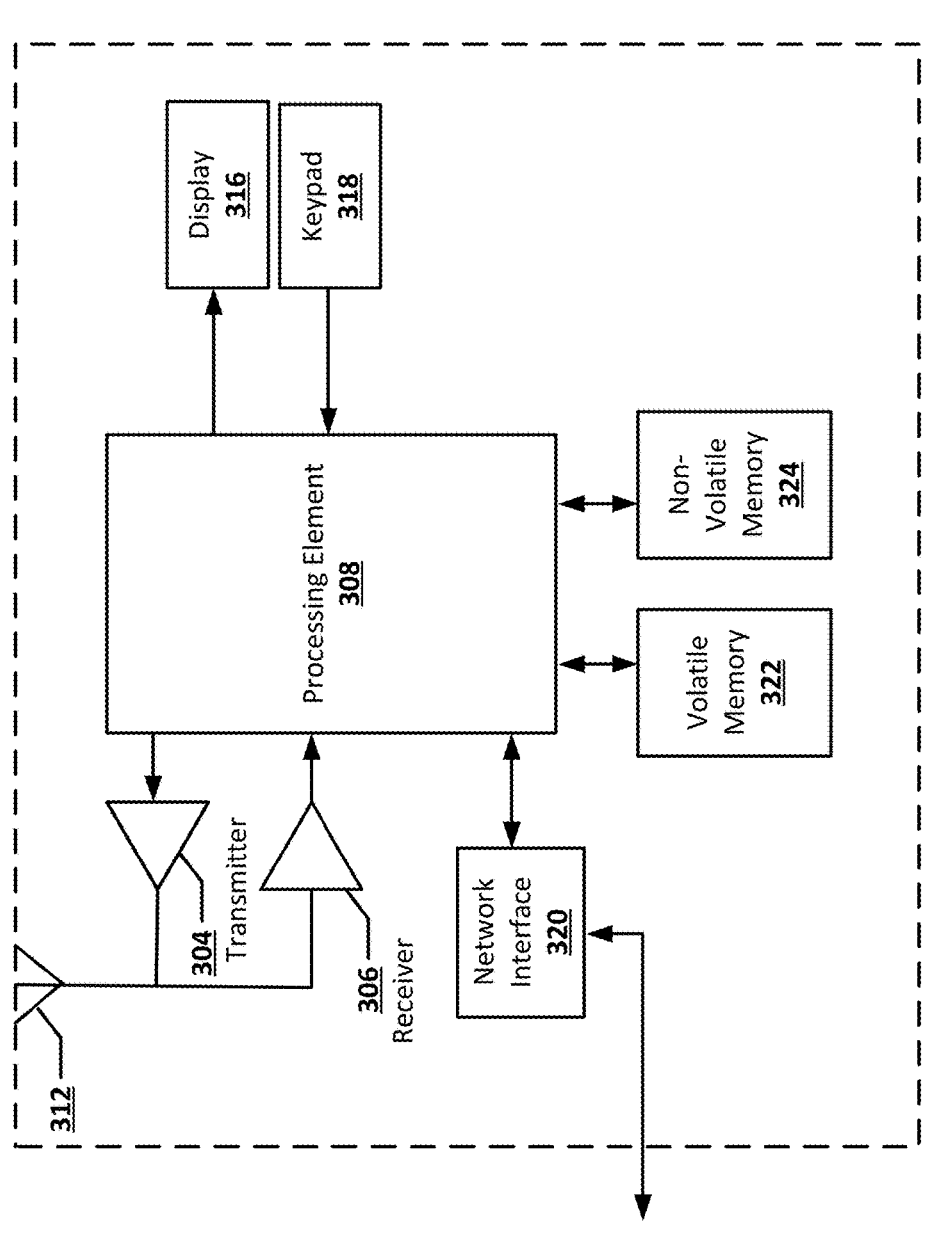
FIG. 3

400

```
┌─────────────────────────────────────────────┐
│         Identify a service scoring request    │
│                    401                        │
└─────────────────────────────────────────────┘
                      │
                      ▼
┌─────────────────────────────────────────────┐
│ Determine a service-based within-cluster      │
│ consistency score                             │
│                    402                        │
└─────────────────────────────────────────────┘
                      │
                      ▼
┌─────────────────────────────────────────────┐
│ Determine a recipient-based within-cluster    │
│ consistency score                             │
│                    403                        │
└─────────────────────────────────────────────┘
                      │
                      ▼
┌─────────────────────────────────────────────┐
│    Determine a cross-cluster consistency score│
│                    404                        │
└─────────────────────────────────────────────┘
                      │
                      ▼
┌─────────────────────────────────────────────┐
│   Determine a cross-temporal consistency score│
│                    405                        │
└─────────────────────────────────────────────┘
                      │
                      ▼
┌─────────────────────────────────────────────┐
│    Determine an integrative predicted score   │
│                    406                        │
└─────────────────────────────────────────────┘
                      │
                      ▼
┌─────────────────────────────────────────────┐
│       Perform prediction-based actions        │
│                    407                        │
└─────────────────────────────────────────────┘
```

Identify performance records
501

Determine a service clustering scheme
502

For each service cluster, determine a service cluster variation measure
503

Determine a service-based within-cluster consistency score based on each service cluster variation measure
504

403

Identify performance records
601

Determine a recipient clustering scheme
602

For each recipient cluster, determine a recipient cluster
variation measure
603

Determine a recipient-based within-cluster consistency
score based on each recipient cluster variation measure
604

404
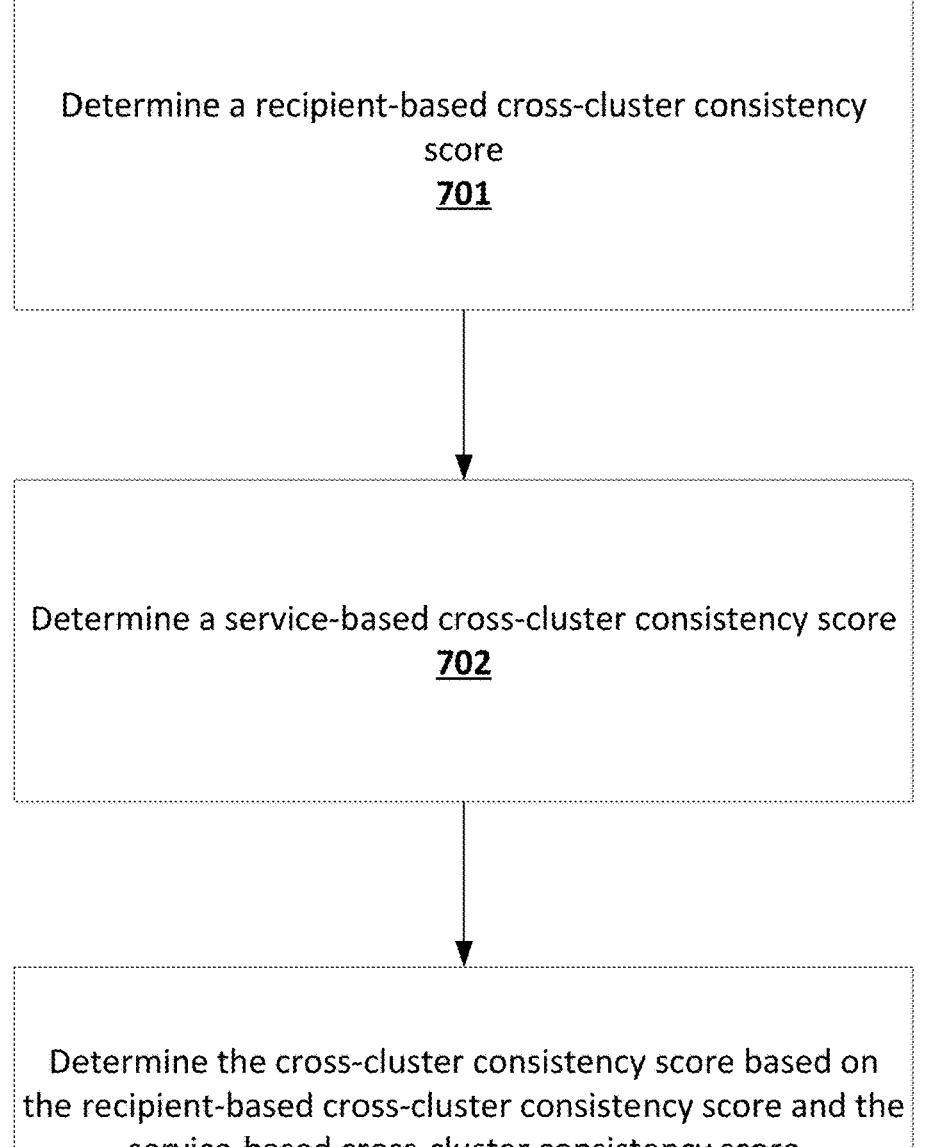
Determine a recipient-based cross-cluster consistency score
701
Determine a service-based cross-cluster consistency score
702
Determine the cross-cluster consistency score based on the recipient-based cross-cluster consistency score and the service-based cross-cluster consistency score
703
FIG. 7

MACHINE LEARNING TECHNIQUES FOR INTEGRATING DISTINCT CLUSTERING SCHEMES GIVEN TEMPORAL VARIATIONS

BACKGROUND

Various embodiments of the present invention address technical challenges related to performing predictive data analysis operations and address the efficiency and reliability shortcomings of various existing predictive data analysis solutions, in accordance with at least some of the techniques described herein.

BRIEF SUMMARY

In general, embodiments of the present invention provide methods, apparatus, systems, computing devices, computing entities, and/or the like for performing predictive data analysis operations. For example, certain embodiments of the present invention utilize systems, methods, and computer program products that perform predictive data analysis operations by generating integrative predicted scores based at least in part on at least one of: within-cluster consistency scores determined for clusters determined using a first clustering scheme (e.g., a service clustering scheme), within-cluster consistency scores determined for clusters determined using a second clustering scheme (e.g., a recipient clustering scheme), cross-cluster consistency scores, and cross-temporal consistency scores.

In accordance with one aspect, a method is provided. In one embodiment, the method comprises: identifying a service clustering scheme and a recipient clustering scheme for a predictive entity, wherein: (i) the service clustering scheme divides the plurality of performance records into a plurality of service clusters, and (ii) the recipient clustering scheme divides the plurality of performance records into a plurality of recipient clusters; for each performance record, determining a performance measure; for each service cluster, determining a service cluster variation measure based at least in part on variation of each performance measure for the service cluster; for each recipient cluster, determining a recipient cluster variation measure based at least in part on variation of each performance measure for the recipient cluster; determining, based at least in part on the service cluster variation measure for a target service cluster of the plurality of service clusters, a service-based within-cluster consistency score; determining, based at least in part on the recipient cluster variation measure for a target recipient cluster of the plurality of recipient clusters, a recipient-based within-cluster consistency score; determining a service-based cross-cluster consistency score based at least in part on variation of each service cluster aggregation measure; determining a recipient-based cross-cluster consistency score based at least in part on variation of each recipient cluster aggregation measure; determining the integrative predicted score based at least in part on the service-based within-cluster consistency score, the recipient-based within-cluster consistency score, the recipient-based cross-cluster consistency score, and the service-based cross-cluster consistency score; and performing one or more prediction-based actions.

In accordance with another aspect, a computer program product is provided. The computer program product may comprise at least one computer-readable storage medium having computer-readable program code portions stored therein, the computer-readable program code portions comprising executable portions configured to: identify a service clustering scheme and a recipient clustering scheme for a predictive entity, wherein: (i) the service clustering scheme divides the plurality of performance records into a plurality of service clusters, and (ii) the recipient clustering scheme divides the plurality of performance records into a plurality of recipient clusters; for each performance record, determine a performance measure; for each service cluster, determine a service cluster variation measure based at least in part on variation of each performance measure for the service cluster; for each recipient cluster, determine a recipient cluster variation measure based at least in part on variation of each performance measure for the recipient cluster; determine, based at least in part on the service cluster variation measure for a target service cluster of the plurality of service clusters, a service-based within-cluster consistency score; determine, based at least in part on the recipient cluster variation measure for a target recipient cluster of the plurality of recipient clusters, a recipient-based within-cluster consistency score; determine a service-based cross-cluster consistency score based at least in part on variation of each service cluster aggregation measure; determine a recipient-based cross-cluster consistency score based at least in part on variation of each recipient cluster aggregation measure; determine the integrative predicted score based at least in part on the service-based within-cluster consistency score, the recipient-based within-cluster consistency score, the recipient-based cross-cluster consistency score, and the recipient-based cross-cluster consistency score; and perform one or more prediction-based actions.

In accordance with yet another aspect, an apparatus comprising at least one processor and at least one memory including computer program code is provided. In one embodiment, the at least one memory and the computer program code may be configured to, with the processor, cause the apparatus to: identify a service clustering scheme and a recipient clustering scheme for a predictive entity, wherein: (i) the service clustering scheme divides the plurality of performance records into a plurality of service clusters, and (ii) the recipient clustering scheme divides the plurality of performance records into a plurality of recipient clusters; for each performance record, determine a performance measure; for each service cluster, determine a service cluster variation measure based at least in part on variation of each performance measure for the service cluster; for each recipient cluster, determine a recipient cluster variation measure based at least in part on variation of each performance measure for the recipient cluster; determine, based at least in part on the service cluster variation measure for a target service cluster of the plurality of service clusters, a service-based within-cluster consistency score; determine, based at least in part on the recipient cluster variation measure for a target recipient cluster of the plurality of recipient clusters, a recipient-based within-cluster consistency score; determine a service-based cross-cluster consistency score based at least in part on variation of each service cluster aggregation measure; determine a recipient-based cross-cluster consistency score based at least in part on variation of each recipient cluster aggregation measure; determine the integrative predicted score based at least in part on the service-based within-cluster consistency score, the recipient-based within-cluster consistency score, the recipient-based cross-cluster consistency score, and the recipient-based cross-cluster consistency score; and perform one or more prediction-based actions.

BRIEF DESCRIPTION OF THE DRAWINGS

Figure 1:
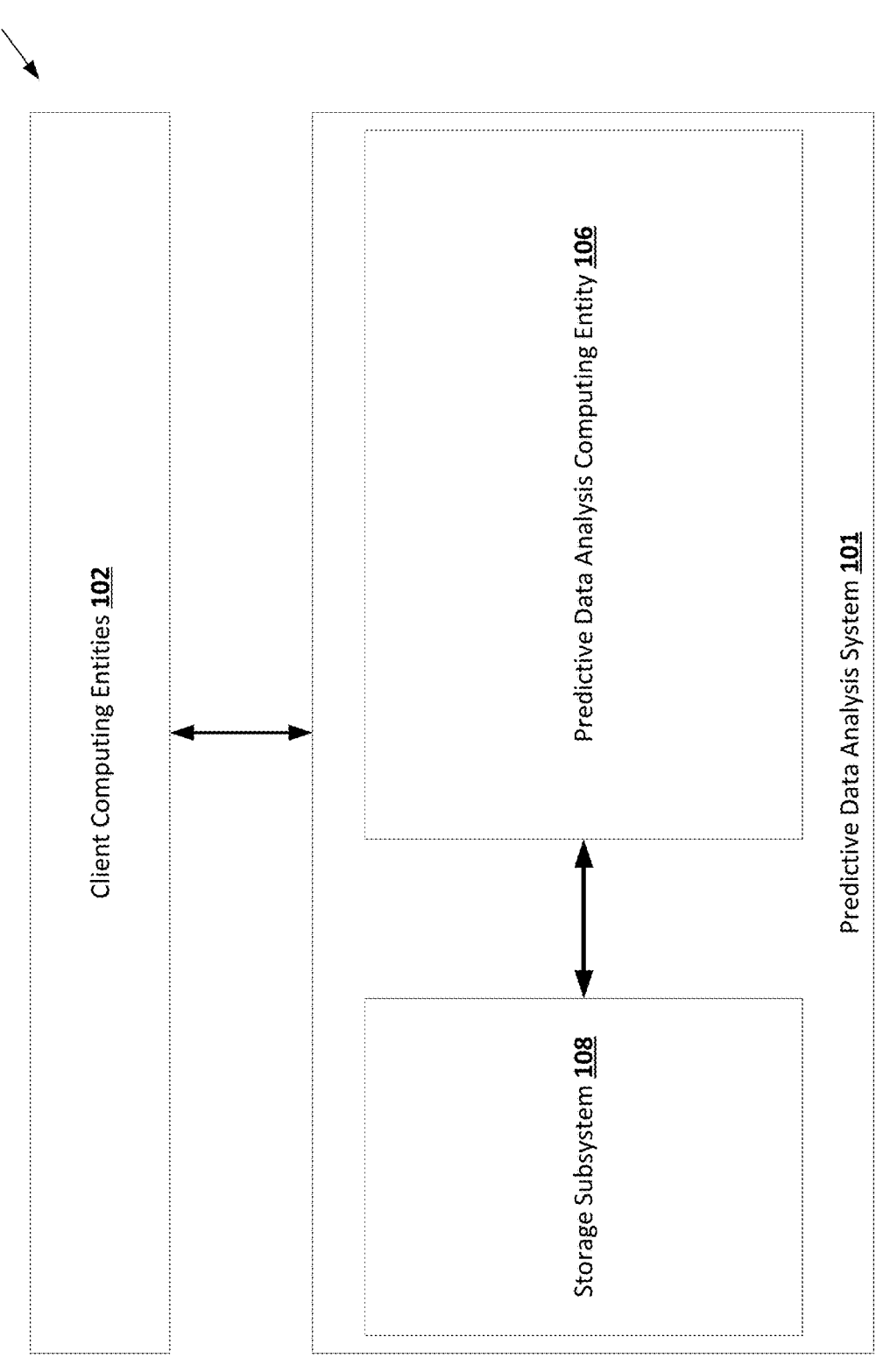

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
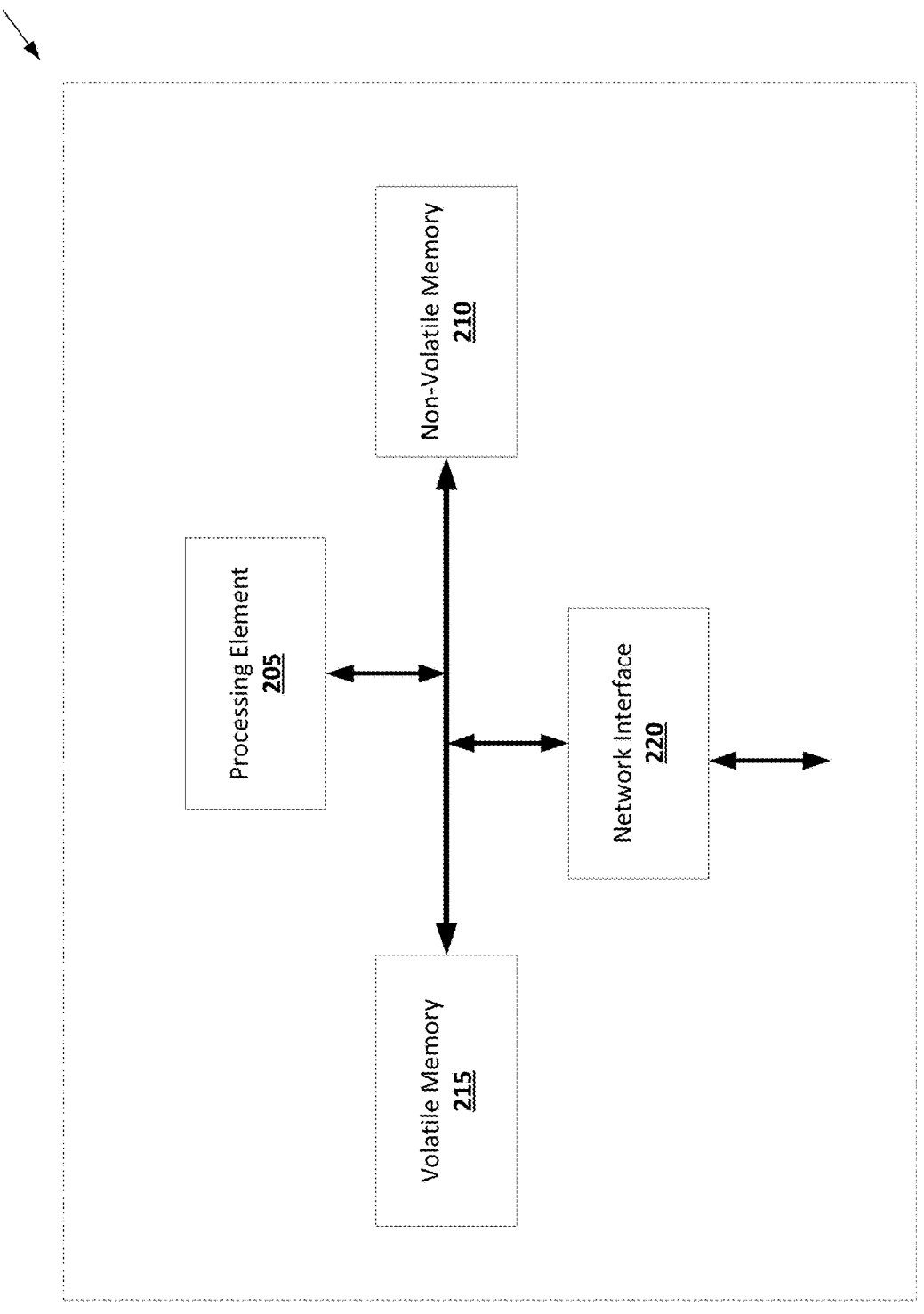

FIG. 2 provides an example predictive data analysis computing entity in accordance with some embodiments discussed herein.

FIG. 3 provides an example client computing entity in accordance with some embodiments discussed herein.

FIG. 4 is a flowchart diagram of an example process for determining an integrative predicted score for a predictive entity in accordance with one or more optimal imbalance adjustment conditions in accordance with some embodiments discussed herein.

Figure 5:

FIG. 5 is a flowchart diagram of an example process for determining a service-based within-cluster consistency score for a predictive entity in accordance with one or more optimal imbalance adjustment conditions in accordance with some embodiments discussed herein.

Figure 6:

FIG. 6 is a flowchart diagram of an example process for determining a recipient-based within-cluster consistency score for a predictive entity in accordance with one or more optimal imbalance adjustment conditions in accordance with some embodiments discussed herein.

FIG. 7 is a flowchart diagram of an example process for determining cross-cluster consistency score for a predictive entity in accordance with one or more optimal imbalance adjustment conditions in accordance with some embodiments discussed herein.

Figure 8:
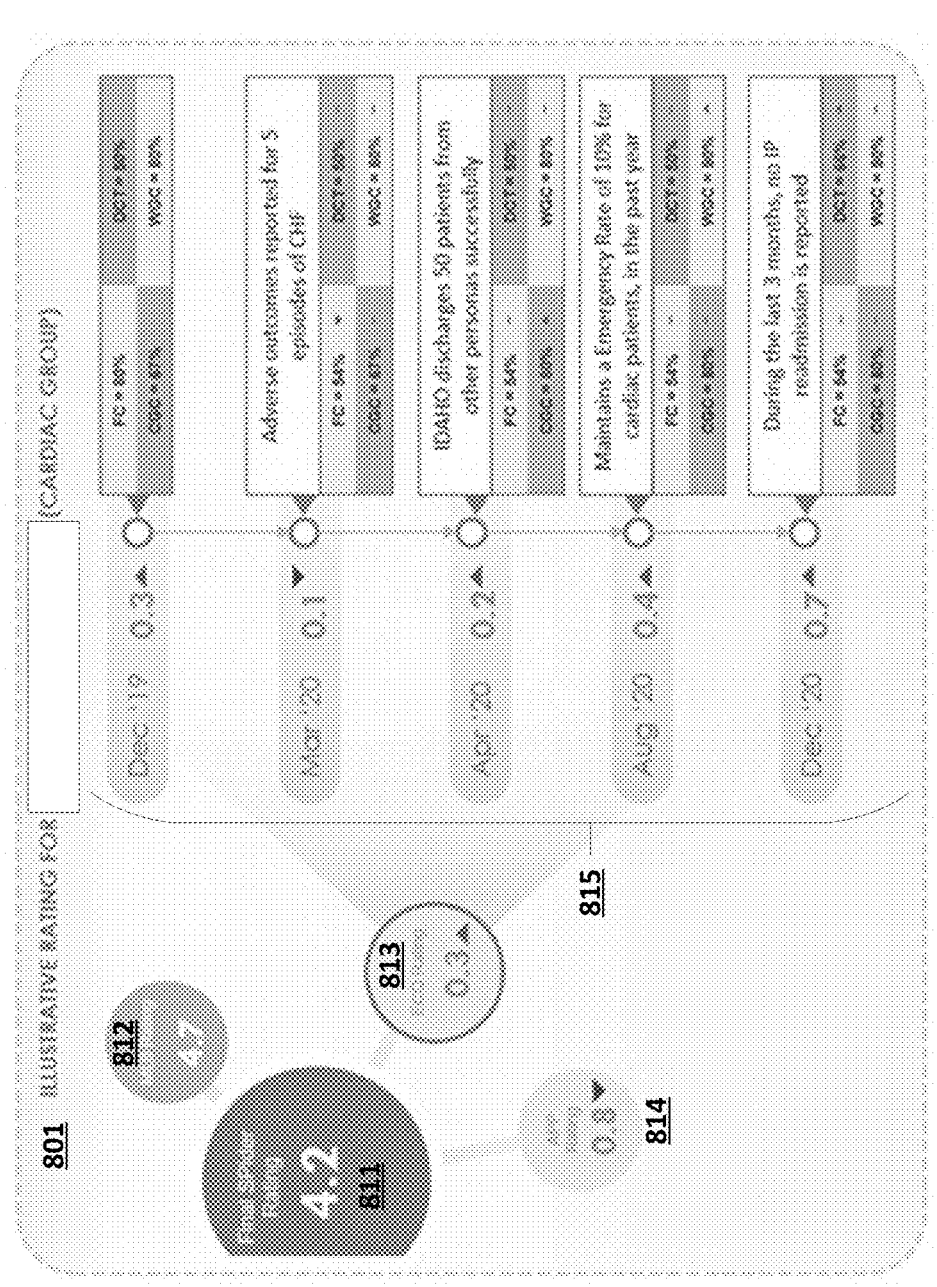

FIG. 8 provides an operational example of a prediction output user interface that describes metadata related to computation of an integrative predicted score for a predictive entity in accordance with some embodiments discussed herein.

Figure 9:
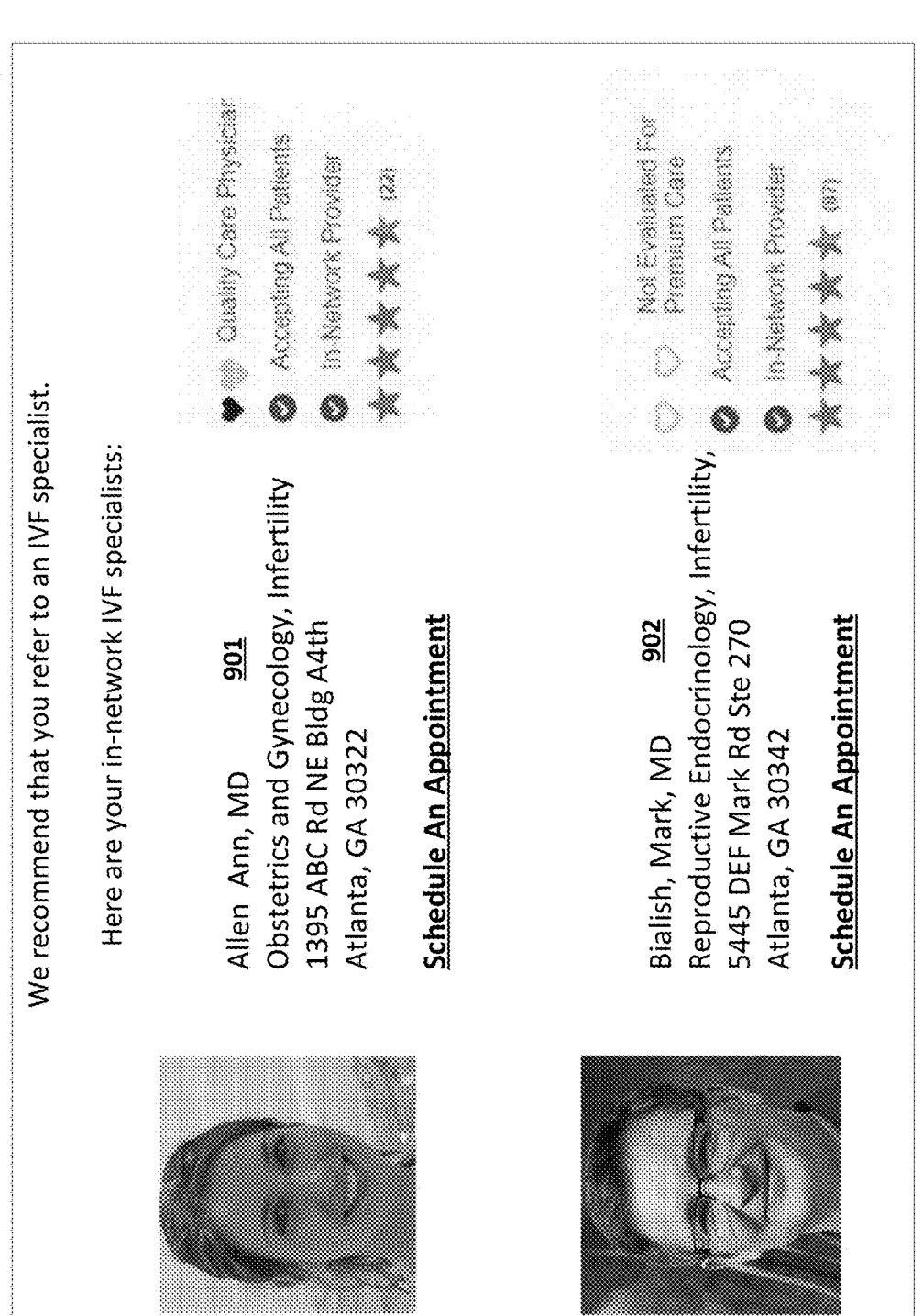

FIG. 9 provides an operational example of a prediction output user interface that provides a ranking of recommended provider identifiers based at least in part on integrative predicted scores for the noted predictive entities in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. Overview and Technical Improvements

Various embodiments of the present invention enable integrating predictive insights from two or more clustering schemes to generate integrative predictive outputs (e.g., integrative predicted scores). The disclosed techniques enable dividing a group of predictive input objects (e.g., a group of performance records) using two sets of clustering operations, such that each predictive input object is associated with a first cluster of a first clustering scheme and a second cluster of a second clustering scheme. This avoids the need for consolidating the features needed to perform each of the two clustering operation sets in order to create an overall clustering space that may have an excessive number of dimensions and eventually produce a suboptimal number of high-quality clusterings. Since the sparsity and multi-dimensionality of clustering spaces is a major challenge facing effective and efficient clustering operations, by disclosing techniques for integrating predictive insights from two or more clustering schemes to generate integrative predictive outputs, various embodiments of the present invention improve effectiveness and efficiency of various predictive data analysis operations that involve clustering of predictive input objects. In doing so, various embodiments of the present invention make important technical contributions to the fields of predictive data analysis and machine learning.

Various embodiments of the present invention enable integrating predictive insights from two or more clustering schemes to generate integrative predictive outputs (e.g., integrative predicted scores) based at least in part on predictive input objects that may have a temporal distribution, such that each predictive input object may be associated with a time unit in a sequence of time units that may be distinct from the time unit of another predictive input objects. Because predictive input objects associated with distinct time units may be associated with distinct feature sets and/or distinct feature value distributions imposed by contextual and operational conditions of the distinct time units, temporal variations cause substantial challenges for performing effective and efficient clustering operations. Various embodiments of the present invention address the noted challenges by introducing techniques for generating cross-temporal consistency scores based at least in part on per-time-unit clustering-scheme-specific within-cluster consistency scores and/or per-time-unit clustering-scheme-specific cross-cluster consistency scores. By disclosing the noted techniques, various embodiments of the present invention improve effectiveness and efficiency of various predictive data analysis operations that involve clustering of predictive input objects given temporal variations of the input space for the clustering operations. In doing so, various embodiments of the present invention make further important technical contributions to the fields of predictive data analysis and machine learning. In some embodiments, various embodiments of the present invention can be used to implement a recommender system, such as a provider recommender system.

II. Definitions

The term "service-based within-cluster consistency score" may refer to a data construct that is configured to describe a service cluster variation measure for a service cluster of performance records associated with a corresponding predictive entity that includes a target service identifier. For example, the target service identifier may describe an attribute of a requested service associated with an incoming service request, such as a chief complaint type, a diagnosis type, and/or other focus type of the requested service. Then, performance records (e.g., describing past service deliveries) associated with a predictive entity that is associated with a particular service provider (e.g., a particular medical provider) may be clustered into a set of service clusters based at least in part on the service identifiers of the performance records, such that each service identifier for a performance records is associated with a separate service cluster of the set of service clusters. Afterward, a target service cluster of the set of service clusters that is associated with the target service identifier is identified, and the service cluster variation measure for the target service cluster is used to generate the noted service-based within-cluster consistency score. In some embodiments, a service-based within-cluster consistency score may be determined based at least in part on the output of the equation $$FC_C = n(a_{i=1}^N(CV(i, C))),$$

where: (i) $FC_C$ is the service-based within-cluster consistency score, (ii) $CV(i,C)$ is a measure of variation for a target service cluster C for an ith performance measure of a set of N performance measures, (iii) n is a normalization function to scale values between 0 and 1, and (iv) a is an aggregation function such as a summation aggregation function or a multiplicative aggregation function. In some embodiments, $CV(i,C)$ is determined based at least in part on the output of the equation $$CV(i, C) = v_{pat=1}^{A_C}(i),$$

where (i) is a coefficient of variation for the ith performance measure across all of the performance records in C, (ii) $A_c$ is the total number of performance records in C, and (iii) pat is an index variable that iterates overall performance records in C. In some embodiments, to generate the service-based within-cluster consistency score for a service scoring request that is associated with a particular target service identifier, the predictive data analysis computing entity: (i) identifies a service cluster that includes performance records whose respective service identifiers are deemed to be most similar to the target service identifier, (ii) identifies the service cluster variation measure for the noted service cluster, and (iii) determines the service-based within-cluster consistency score based at least in part on the service cluster variation measure. In some embodiments, the service-based within-cluster consistency score is a ranged value (e.g., a value in the range [0, 1], a value in the range [0.01, 1.00], and/or the like) that has a negative correlation with the service cluster variation measure for the target service cluster, such that the higher the service cluster variation measure for the target service cluster the lower the service-based within-cluster consistency score and vice-versa.

The term "service clustering scheme" may refer to a data construct that is configured to describe an association of each performance record with a service cluster of a set of generated service clusters. In some embodiments, to determine the service clustering scheme, a set of service identifiers comprising each service identifier for a performance record associated with the predictive entity are identified. Afterward, feature data for each service identifier is used to generate a service embedding for the service identifier, and then the service embeddings for the service identifiers are mapped to a multi-dimensional service embedding clustering space. Afterwards, a clustering algorithm (e.g., a k-means algorithm) is used to determine a set of service clusters based at least in part on distances between service embeddings in the multi-dimensional service embedding clustering space. In some embodiments, generating the service clustering scheme comprises: (i) generating a service embedding for each service identifier, and (ii) generating the plurality of service clusters based at least in part on distances across each service embedding.

The term "service cluster variation measure" may refer to a data construct that is configured to describe variation of performance measures for performance records that are associated with a corresponding service cluster. In some embodiments, given a set of performance records each associated with a set of N performance measures, the set of N performance measures for each performance records are aggregated to generate an aggregate performance measure for the performance record, and then a measure of variation (e.g., a statistical measure of variation, a machine-learning-inferred measure of variation, a measure of variation determined using one or more significance testing operations, and/or the like) of the aggregate performance measures for those performance records that fall within a defined service cluster are used to generate the service cluster variation measure for the noted defined service cluster. In some embodiments, given a set of performance records of a service cluster that are associated with a set of N performance measures, a variation measure is determined for each of the N performance measures with respect to the service cluster, and then the n variation measures that relate to the service cluster are subsequently combined/aggregated to generate the service cluster variation measure for the service cluster.

The term "recipient-based within-cluster consistency score" may refer to a data construct that is configured to describe a recipient cluster variation measure for a recipient cluster of performance records associated with a corresponding predictive entity that includes a target recipient identifier (e.g., a target patient identifier). For example, the target recipient identifier may describe an attribute of a corresponding recipient (e.g., a corresponding service recipient, such as a corresponding patient) associated with an incoming recipient request, such as one or more of recorded behavioral traits of the recipient, demographic markers of the recipient, feature data related to historical clinical encounters of the recipient, feature data related to historical clinical encounters of a set of recipients that are deemed to be similar to the recipient, and/or the like. Then, performance records (e.g., describing past service deliveries) associated with a predictive entity that is associated with a particular service provider (e.g., a particular medical provider) may be clustered into a set of recipient clusters based at least in part on the recipient identifiers of the performance records, such that each recipient identifier for a performance records is associated with a separate recipient cluster of the set of recipient clusters. Afterward, a target recipient cluster of the set of recipient clusters that is associated with the target recipient identifier is identified, and the recipient cluster variation measure for the target recipient cluster is used to generate the noted recipient-based within-cluster consistency score. In some embodiments, a recipient-based within-cluster consistency score may be determined based at least in part on the output of the equation $$WGC_P = n(a_{i=1}^N(CV(i, P))),$$

where: (i) $WGC_P$ is the recipient-based within-cluster consistency score, (ii) $CV(i,P)$ is a measure of variation for a target recipient cluster C for an ith performance measure of a set of N performance measures, (iii) n is a normalization function to scale values between 0 and 1, and (iv) a is an aggregation function such as a summation aggregation function or a multiplicative aggregation function. In some embodiments, CV (i,P) is determined based at least in part on the output of the equation $$CV(i, P) = v^{A_P}_{pat=1}(i),$$

where (i) is a coefficient of variation for the ith performance measure across all of the performance records in C, (ii) $A_P$ is the total number of performance records in C, and (iii) pat is an index variable that iterates overall performance records in C. In some embodiments, to generate the recipient-based within-cluster consistency score for a service scoring request that is associated with a particular target recipient identifier, the predictive data analysis computing entity: (i) identifies a recipient cluster that includes performance records whose respective recipient identifiers are deemed to be most similar to the target recipient identifier, (ii) identifies the recipient cluster variation measure for the noted recipient cluster, and (iii) determines the recipient-based within-cluster consistency score based at least in part on the recipient cluster variation measure. In some embodiments, the recipient-based within-cluster consistency score is a ranged value (e.g., a value in the range [0, 1], a value in the range [0.01, 1.00], and/or the like) that has a negative correlation with the recipient cluster variation measure for the target recipient cluster, such that the higher the recipient cluster variation measure for the target recipient cluster the lower the recipient-based within-cluster consistency score and vice-versa.

The term "recipient clustering scheme" may refer to a data construct that is configured to describe an association of each performance record with a recipient cluster of a set of generated recipient clusters. In some embodiments, to determine the recipient clustering scheme, a set of recipient identifiers comprising each recipient identifier for a performance record associated with the predictive entity are identified. Afterward, feature data for each recipient identifier is used to generate a recipient embedding for the recipient identifier, and then the recipient embeddings for the recipient identifiers are mapped to a multi-dimensional recipient embedding clustering space. Afterwards, a clustering algorithm (e.g., a k-means algorithm) is used to determine a set of recipient clusters based at least in part on distances between recipient embeddings in the multi-dimensional recipient embedding clustering space. In some embodiments, generating the recipient clustering scheme comprises: (i) generating a recipient embedding for each recipient identifier, and (ii) generating the plurality of recipient clusters based at least in part on distances across each recipient embedding.

The term "recipient cluster variation measure" may refer to a data construct that is configured to describe variation of performance measures for performance records that are associated with a corresponding recipient cluster. In some embodiments, given a set of performance records each associated with a set of N performance measures, the set of N performance measures for each performance records are aggregated to generate an aggregate performance measure for the performance record, and then a measure of variation (e.g., a statistical measure of variation, a machine-learning-inferred measure of variation, a measure of variation determined using one or more significance testing operations, and/or the like) of the aggregate performance measures for those performance records that fall within a defined recipient cluster are used to generate the recipient cluster variation measure for the noted defined recipient cluster. In some embodiments, given a set of performance records of a recipient cluster that are associated with a set of N performance measures, a variation measure is determined for each of the N performance measures with respect to the recipient cluster, and then the n variation measures that relate to the recipient cluster are subsequently combined/aggregated to generate the recipient cluster variation measure for the recipient cluster.

The term "cross-cluster consistency score" may refer to a data construct that is configured to describe at least one of: (i) a variation measure for service-based within-cluster consistency scores for a set of service clusters associated with performance records for a corresponding predictive entity, and (ii) a variation measure for recipient-based within-cluster consistency scores for a set of recipient clusters associated with performance records for a corresponding predictive entity. In some embodiments, the cross-cluster consistency score for a predictive entity is determined based at least in part on the output of aggregating/combining the service-based cross-cluster consistency score for the predictive entity and the recipient-based cross-cluster consistency score for the predictive entity. In some embodiments, the cross-cluster consistency score for a predictive entity is determined based at least in part on the output of the equation $CGC=b(CGC_P(PR),CGC_C(PR))$, where: (i) CGC is the cross-cluster consistency score, (ii) $CGC_P(PR)$ is the recipient-based cross-cluster consistency score for the predictive entity, (iii) $CGC_C(PR)$ is the service-based cross-cluster consistency score for the predictive entity, and (iv) b is an aggregation function The term "recipient-based cross-cluster consistency score" may refer to a data construct that is configured to describe a measure of variation of recipient-based within-cluster consistency scores for a set of recipient clusters associated with performance records for the corresponding predictive entity. The measure of variation measure may be determined based at least in part on at least one of a statistical measure of variation, a machine-learning-inferred measure of variation, a measure of variation determined using one or more significance testing operations, and/or the like. In some embodiments, the recipient-based cross-cluster consistency score is a ranged value (e.g., a value in the range [0, 1], a value in the range [0.01, 1.00], and/or the like) that has a negative correlation with the aggregated measure of variation of central tendencies of each of the N performance measure, calculated on all recipient clusters. In some embodiments, the recipient-based cross-cluster consistency score for a predictive entity is determined based at least in part on the output of the equation $$CGC_P(PR) = n\big(a^N_{i=1}\big(v^P_{persona=1}CT(i, persona, PR),$$

where: (i) $CGC_P(PR)$ is the recipient-based cross-cluster consistency score for the predictive entity, (ii) CT is a function whose output is determined based at least in part on a central tendency measure (e.g., an average measure) of each performance measure for a particular recipient cluster, (iii) persona is an index variable that iterates over P recipient clusters, (iv) v is a coefficient of variation of an ith performance measure of N performance measures in a particular recipient cluster, (v) a is an aggregation function, and (vi) n is a normalization function. In some of the noted embodiments, the CT(i,persona,PR) factor is determined based at least in part on the output of the equation $$C(i, persona, PR) = CT_{pat=1}^{A_P}(i, pat, PR),$$

where pat is an index variable whose value iterates over $A_P$ performance records that are an in ith recipient cluster, and where CT is a central-tendency-measure-based function as described above.

The term "service-based cross-cluster consistency score" may refer to a data construct that is configured to describe a measure of variation of service-based cross-cluster consistency score may describe a measure of variation of service-based within-cluster consistency scores for a set of service clusters associated with performance records for the corresponding predictive entity. The measure of variation measure may be determined based at least in part on at least one of a statistical measure of variation, a machine-learning-inferred measure of variation, a measure of variation determined using one or more significance testing operations, and/or the like. In some embodiments, the service-based cross-cluster consistency score is a ranged value (e.g., a value in the range [0, 1], a value in the range [0.01, 1.00], and/or the like) that has a negative correlation with the aggregated measure of variation of central tendencies of each of the N performance measures, calculated on all service clusters. In some embodiments, the service-based cross-cluster consistency score for a predictive entity is determined based at least in part on the output of the equation $$CGC_C(PR) = n\left(a_{i=1}^N\left(v_{chiefcomp=1}^C CT(i, chiefcomp, PR)\right),\right.$$

where: (i) $CGC_C(PR)$ is the service-based cross-cluster consistency score for the predictive entity, (ii) CT is a function whose output is determined based at least in part on a central tendency measure (e.g., an average measure) of each performance measure for a particular service cluster, (iii) chiefcomp is an index variable that iterates over C service clusters, (iv) v is a coefficient of variation of an ith performance measure of N performance measures in a particular service cluster, (v) a is an aggregation function, and (vi) n is a normalization function. In some of the noted embodiments, the T(i,chiefcomp,PR) factor is determined based at least in part on the output of the equation $$CT(i, chiefcomp, PR) = CT_{pat=1}^{A_P}(i, pat, PR),$$

where pat is an index variable whose value iterates over $A_C$ performance records that are an in ith service cluster, and where CT is a central-tendency-measure-based function as described above.

The term "cross-temporal consistency score" may refer to a data construct that is configured to describe describes one or more trends associated with consistency scores (e.g., recipient-based within-cluster consistency scores, service-based within-cluster consistency scores, recipient-based cross-cluster consistency scores, service-based cross-cluster consistency scores, and/or the like) of a set of time units associated with performance records of a corresponding predictive entity. In some embodiments, each performance record for a predictive entity is associated with a time unit of a set of time units (e.g., a sequence of time units), each time unit is associated with a temporal consistency score set, and the cross-temporal consistency score for the predictive entity that is determined based at least in part on a variation measure determined based at least in part on each temporal consistency score set. In some embodiments, given a sequence of T timesteps having corresponding T inputs vectors determined based at least in part on corresponding T temporal consistency score sets, the T input vectors are processed using T operational timesteps of a recurrent neural network machine learning model (e.g., a conventional recurrent neural network machine learning model, a gated recurrent unit recurrent neural network machine learning model, a long short term memory recurrent neural network machine learning model, a stacked recurrent neural network machine learning model, and/or the like). In some embodiments, during each operational timestep, the recurrent neural network machine learning model is configured to process an input vector for the operational timestep and a preceding hidden state vector for the timestep to generate an updated hidden state vector for the operational timestep. In some embodiments, the preceding hidden state vector for an initial operational timestep is a default hidden state vector (e.g., an all zero hidden state vector). In some embodiments, the preceding hidden state vector for each non-initial operational timestep is the updated hidden state vector for a preceding operational timestep (e.g., the preceding hidden state vector for an ith operational timestep is the updated hidden state vector for the (i−1)th operational timestep). In some embodiments, the cross-temporal consistency score is determined based at least in part on the updated hidden state for a final operational timestep.

The term "temporal consistency score set" may refer to a data construct that is configured to describe at least one of: (i) a per-time-unit service-based within-cluster consistency score for the time unit that is determined based at least in part on a plurality of per-time-unit service clusters for a subset of the plurality of performance records that is associated with the particular time unit (i.e., a subset including performance records whose corresponding timestamps fall within the particular time unit), (ii) a per-time-unit recipient-based within-cluster consistency score for the time unit that is determined based at least in part on a plurality of per-time-unit recipient clusters for a subset of the plurality of performance records that is associated with the particular time unit, (iii) a per-time-unit service-based cross-cluster consistency score for the time unit that is determined based at least in part on a plurality of per-time-unit service clusters for a subset of the plurality of performance records that is associated with the particular time unit, and (iv) a per-time-unit recipient-based cross-cluster consistency score for the time unit that is determined based at least in part on a plurality of per-time-unit recipient clusters for a subset of the plurality of performance records that is associated with the particular time unit.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a scripting language, a database query or search language, and/or a report writing language. In one or more example embodiments, a software component comprising instructions in one of the foregoing examples of programming languages may be executed directly by an operating system or other software components without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid-state card (SSC), solid-state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read-only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 config-ured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is processing a request for generating a performance score for a service provider in relation to an incoming service request.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in several different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention enable integrating predictive insights from two or more clustering schemes to generate integrative predictive outputs (e.g., integrative predicted scores). The disclosed techniques enable dividing a group of predictive input objects (e.g., a group of performance records) using two sets of clustering operations, such that each predictive input object is associated with a first cluster of a first clustering scheme and a second cluster of a second clustering scheme. This avoids the need for consolidating the features needed to perform each of the two clustering operation sets in order to create an overall clustering space that may have an excessive number of dimensions and eventually produce a suboptimal number of high-quality clusterings. Since the sparsity and multi-dimensionality of clustering spaces is a major challenge facing effective and efficient clustering operations, by disclosing techniques for integrating predictive insights from two or more clustering schemes to generate integrative predictive outputs, various embodiments of the present invention improve effectiveness and efficiency of various predictive data analysis operations that involve clustering of predictive input objects. In doing so, various embodiments of the present invention make important technical contributions to the fields of predictive data analysis and machine learning.

FIG. 4 is a flowchart diagram of an example process 400 for determining an integrative predicted score for a predictive entity with respect to a service request that is associated with a target service identifier and a target recipient identifier. Via the various steps/operations of the process 400, the predictive data analysis computing entity 106 can use predictive insights determined based at least in part on two or more clustering schemes of performance records associated with a predictive entity in order to generate a predicted score for the predictive entity.

The process 400 begins at step/operation 401 when the predictive data analysis computing entity 106 identifies (e.g., receives) a service scoring request that describes: (i) an incoming service request describing the target service identifier and the target recipient identifier, and (ii) a predictive entity with respect to which the incoming service request is being predictively scored. For example, the service scoring request may include a request for generating a predicted score for a predictive entity that is associated with a particular service provider (e.g., a particular medical provider) in delivering services related to the target service identifier and the target recipient identifier. In this example, the target service identifier may describe an attribute of a requested service associated with the incoming service request, such as a chief complaint type, a diagnosis type, and/or other focus type of the requested service. Moreover, the target recipient identifier may describe one or more attributes of a patient identifier associated with the incoming service request, such as one or more of recorded behavioral traits of the patient identifier, demographic markers of the patient identifier, feature data related to historical clinical encounters of the patient identifier, feature data related to historical clinical encounters of a set of patient identifiers that are deemed to be similar to the patient identifier, and/or the like.

At step/operation 402, the predictive data analysis computing entity 106 determines a service-based within-cluster consistency score for the predictive entity. The service-based within-cluster consistency score may describe a service cluster variation measure for a service cluster of performance records associated with a corresponding predictive entity that includes a target service identifier. For example, the target service identifier may describe an attribute of a requested service associated with an incoming service request, such as a chief complaint type, a diagnosis type, and/or other focus type of the requested service. Then, performance records (e.g., describing past service deliveries) associated with a predictive entity that is associated with a particular service provider (e.g., a particular medical provider) may be clustered into a set of service clusters based at least in part on the service identifiers of the performance records, such that each service identifier for a performance records is associated with a separate service cluster of the set of service clusters. Afterward, a target service cluster of the set of service clusters that is associated with the target service identifier is identified, and the service cluster variation measure for the target service cluster is used to generate the noted service-based within-cluster consistency score.

In some embodiments, a service-based within-cluster consistency score may be determined based at least in part on the output of the equation $$FC_C = n\left(a_{i=1}^N(CV(i, C))\right),$$

where: (i) $FC_C$ is the service-based within-cluster consistency score, (ii) CV(i,C) is a measure of variation for a target service cluster C for an ith performance measure of a set of N performance measures, (iii) n is a normalization function to scale values between 0 and 1, and (iv) a is an aggregation function such as a summation aggregation function or a multiplicative aggregation function. In some embodiments, CV(i,C) is determined based at least in part on the output of the equation $$CV(i, C) = v_{pat=1}^{A_C}(i),$$

where (i) is a coefficient of variation for the ith performance measure across all of the performance records in C, (ii) $A_c$ is the total number of performance records in C, and (iii) pat is an index variable that iterates overall performance records in C. While various embodiments of the present invention are described with respect to performance records having N=1 performance measure, a person of ordinary skill in the relevant technology will recognize that the disclosed techniques can be extended to performance records having two or more performance measures.

In some embodiments, step/operation 402 may be performed in accordance with the process that is depicted in FIG. 5, which is an example process for determining a service-based within-cluster consistency score for a service scoring request that is associated with a predictive entity (e.g., a service provider identifier), a target service identifier and a target recipient identifier. The process that is depicted in FIG. 5 begins at step/operation 501 when the predictive data analysis computing entity 106 identifies the performance records associated with the predictive entity. Each performance record may describe data associated with delivery of a service associated with a corresponding service identifier to a recipient associated with a corresponding recipient identifier. In some embodiments, a performance record may also describe a timestamp associated with the corresponding service delivery. An example of a performance record may describe a performance record that describes delivery of a medical service associated with a particular diagnosis identifier to a particular patient identifier.

At step/operation 502, the predictive data analysis computing entity 106 determines a service clustering scheme that associates each performance record with a service cluster of a set of generated service clusters. In some embodiments, to determine the service clustering scheme, a set of service identifiers comprising each service identifier for a performance record associated with the predictive entity are identified. Afterward, feature data for each service identifier is used to generate a service embedding for the service identifier, and then the service embeddings for the service identifiers are mapped to a multi-dimensional service embedding clustering space. Afterwards, a clustering algorithm (e.g., a k-means algorithm) is used to determine a set of service clusters based at least in part on distances between service embeddings in the multi-dimensional service embedding clustering space. In some embodiments, generating the service clustering scheme comprises: (i) generating a service embedding for each service identifier, and (ii) generating the plurality of service clusters based at least in part on distances across each service embedding.

At step/operation 503, the predictive data analysis computing entity 106 determines a service cluster variation measure for each service cluster. A service cluster variation measure may describe variation of performance measures for performance records that are associated with a corresponding service cluster. In some embodiments, given a set of performance records each associated with a set of N performance measures, the set of N performance measures for each performance records are aggregated to generate an aggregate performance measure for the performance record, and then a measure of variation (e.g., a statistical measure of variation, a machine-learning-inferred measure of variation, a measure of variation determined using one or more significance testing operations, and/or the like) of the aggregate performance measures for those performance records that fall within a defined service cluster are used to generate the service cluster variation measure for the noted defined service cluster.

At step/operation 504, the predictive data analysis computing entity 106 determines the service-based within-cluster consistency score based at least in part on a service cluster variation measure for a target service cluster that is associated the target service identifier. In some embodiments, to generate the service-based within-cluster consistency score for a service scoring request that is associated with a particular target service identifier, the predictive data analysis computing entity: (i) identifies a service cluster that includes performance records whose respective service identifiers are deemed to be most similar to the target service identifier, (ii) identifies the service cluster variation measure for the noted service cluster, and (iii) determines the service-based within-cluster consistency score based at least in part on the service cluster variation measure. In some embodiments, the service-based within-cluster consistency score is a ranged value (e.g., a value in the range [0, 1], a value in the range [0.01, 1.00], and/or the like) that has a negative correlation with the service-based within-cluster consistency score for the target service cluster, such that the higher the service-based within-cluster consistency score for the target service cluster the lower the service-based within-cluster consistency score and vice-versa.

In some embodiments, by using within-cluster consistency scores such as service-based within-cluster consistency scores, various embodiments of the present invention enable integrating predictive insights from two or more clustering schemes to generate integrative predictive outputs (e.g., integrative predicted scores). The disclosed techniques enable dividing a group of predictive input objects (e.g., a group of performance records) using two sets of clustering operations, such that each predictive input object is associated with a first cluster of a first clustering scheme and a second cluster of a second clustering scheme. This avoids the need for consolidating the features needed to perform each of the two clustering operation sets in order to create an overall clustering space that may have an excessive number of dimensions and eventually produce a suboptimal number of high-quality clusterings. Since the sparsity and multidimensionality of clustering spaces is a major challenge facing effective and efficient clustering operations, by disclosing techniques for integrating predictive insights from two or more clustering schemes to generate integrative predictive outputs, various embodiments of the present invention improve effectiveness and efficiency of various predictive data analysis operations that involve clustering of predictive input objects. In doing so, various embodiments of the present invention make important technical contributions to the fields of predictive data analysis and machine learning.

Returning to FIG. 4, at step/operation 403, the predictive data analysis computing entity 106 determines a recipient-based within-cluster consistency score for the predictive entity. The recipient-based within-cluster consistency score may describe a recipient cluster variation measure for a recipient cluster of performance records associated with a corresponding predictive entity that includes a target recipient identifier (e.g., a target patient identifier). For example, the target recipient identifier may describe an attribute of a corresponding recipient (e.g., a corresponding service recipient, such as a corresponding patient) associated with an incoming recipient request, such as one or more of recorded behavioral traits of the recipient, demographic markers of the recipient, feature data related to historical clinical encounters of the recipient, feature data related to historical clinical encounters of a set of recipients that are deemed to be similar to the recipient, and/or the like. Then, performance records (e.g., describing past service deliveries) associated with a predictive entity that is associated with a particular service provider (e.g., a particular medical provider) may be clustered into a set of recipient clusters based at least in part on the recipient identifiers of the performance records, such that each recipient identifier for a performance records is associated with a separate recipient cluster of the set of recipient clusters. Afterward, a target recipient cluster of the set of recipient clusters that is associated with the target recipient identifier is identified, and the recipient cluster variation measure for the target recipient cluster is used to generate the noted recipient-based within-cluster consistency score.

In some embodiments, a recipient-based within-cluster consistency score may be determined based at least in part on the output of the equation $$WGC_P = n\left(a_{i=1}^{N}(CV(i, P))\right),$$

where: (i) $WGC_P$ is the recipient-based within-cluster consistency score, (ii) $CV(i,P)$ is a measure of variation for a target recipient cluster C for an ith performance measure of a set of N performance measures, (iii) n is a normalization function to scale values between 0 and 1, and (iv) a is an aggregation function such as a summation aggregation function or a multiplicative aggregation function. In some embodiments, CV (i,P) is determined based at least in part on the output of the equation $$CV(i, P) = v_{pat=1}^{A_P}(i),$$

where (i) is a coefficient of variation for the ith performance measure across all of the performance records in C, (ii) $A_P$ is the total number of performance records in C, and (iii) pat is an index variable that iterates overall performance records in C.

In some embodiments, step/operation 403 may be performed in accordance with the process that is depicted in FIG. 6, which is an example process for determining a recipient-based within-cluster consistency score for a recipient scoring request that is associated with a predictive entity (e.g., a service identifier), a target service identifier and a target recipient identifier. The process that is depicted in FIG. 6 begins at step/operation 601 when the predictive data analysis computing entity 106 identifies the performance records associated with the predictive entity. Each performance record may describe data associated with delivery of a service associated with a corresponding service identifier to a recipient associated with a corresponding recipient identifier. In some embodiments, a performance record may also describe a timestamp associated with the corresponding recipient delivery. An example of a performance record may describe a performance record that describes delivery of a medical service associated with a particular diagnosis identifier to a particular patient identifier.

At step/operation 602, the predictive data analysis computing entity 106 determines a recipient clustering scheme that associates each performance record with a recipient cluster of a set of generated recipient clusters. In some embodiments, to determine the recipient clustering scheme, a set of recipient identifiers comprising each recipient identifier for a performance record associated with the predictive entity are identified. Afterward, feature data for each recipient identifier is used to generate a recipient embedding for the recipient identifier, and then the recipient embeddings for the recipient identifiers are mapped to a multi-dimensional recipient embedding clustering space. Afterwards, a clustering algorithm (e.g., a k-means algorithm) is used to determine a set of recipient clusters based at least in part on distances between recipient embeddings in the multi-dimensional recipient embedding clustering space. In some embodiments, generating the recipient clustering scheme comprises: (i) generating a recipient embedding for each recipient identifier, and (ii) generating the plurality of recipient clusters based at least in part on distances across each recipient embedding.

At step/operation 603, the predictive data analysis computing entity 106 determines a recipient cluster variation measure for each recipient cluster. A recipient cluster variation measure may describe variation of performance measures for performance records that are associated with a corresponding recipient cluster. In some embodiments, given a set of performance records each associated with a set of N performance measures, the set of N performance measures for each performance records are aggregated to generate an aggregate performance measure for the performance record, and then a measure of variation (e.g., a statistical measure of variation, a machine-learning-inferred measure of variation, a measure of variation determined using one or more significance testing operations, and/or the like) of the aggregate performance measures for those performance records that fall within a defined recipient cluster are used to generate the recipient cluster variation measure for the noted defined recipient cluster.

At step/operation 604, the predictive data analysis computing entity 106 determines the recipient-based within-cluster consistency score based at least in part on a recipient cluster variation measure for a target recipient cluster that is associated the target recipient identifier. In some embodiments, to generate the recipient-based within-cluster consistency score for a service scoring request that is associated with a particular target recipient identifier, the predictive data analysis computing entity: (i) identifies a recipient cluster that includes performance records whose respective recipient identifiers are deemed to be most similar to the target recipient identifier, (ii) identifies the recipient cluster variation measure for the noted recipient cluster, and (iii) determines the recipient-based within-cluster consistency score based at least in part on the recipient cluster variation measure. In some embodiments, the recipient-based within-cluster consistency score is a ranged value (e.g., a value in the range [0, 1], a value in the range [0.01, 1.00], and/or the like) that has a negative correlation with the recipient-based within-cluster consistency score for the target recipient cluster, such that the higher the recipient-based within-cluster consistency score for the target recipient cluster the lower the recipient-based within-cluster consistency score and vice-versa.

In some embodiments, by using within-cluster consistency scores such as recipient-based within-cluster consistency scores, various embodiments of the present invention enable integrating predictive insights from two or more clustering schemes to generate integrative predictive outputs (e.g., integrative predicted scores). The disclosed techniques enable dividing a group of predictive input objects (e.g., a group of performance records) using two sets of clustering operations, such that each predictive input object is associated with a first cluster of a first clustering scheme and a second cluster of a second clustering scheme. This avoids the need for consolidating the features needed to perform each of the two clustering operation sets in order to create an overall clustering space that may have an excessive number of dimensions and eventually produce a suboptimal number of high-quality clusterings. Since the sparsity and multi-dimensionality of clustering spaces is a major challenge facing effective and efficient clustering operations, by disclosing techniques for integrating predictive insights from two or more clustering schemes to generate integrative predictive outputs, various embodiments of the present invention improve effectiveness and efficiency of various predictive data analysis operations that involve clustering of predictive input objects. In doing so, various embodiments of the present invention make important technical contributions to the fields of predictive data analysis and machine learning.

Returning to FIG., at step/operation 404, the predictive data analysis computing entity 106 determines a cross-cluster consistency score for the predictive entity. The cross-cluster consistency score may describe at least one of: (i) a variation measure for service-based within-cluster consistency scores for a set of service clusters associated with performance records for a corresponding predictive entity, and (ii) a variation measure for recipient-based within-cluster consistency scores for a set of recipient clusters associated with performance records for a corresponding predictive entity. In some embodiments, the cross-cluster consistency score for a predictive entity is determined based at least in part on the output of aggregating/combining the service-based cross-cluster consistency score for the predictive entity and the recipient-based cross-cluster consistency score for the predictive entity. In some embodiments, the cross-cluster consistency score for a predictive entity is determined based at least in part on the output of the equation $CGC=b(CGC_P(PR),CGC_C(PR))$, where: (i) CGC is the cross-cluster consistency score, (ii) $CGC_P(PR)$ is the recipient-based cross-cluster consistency score for the predictive entity, (iii) $CGC_C(PR)$ is the service-based cross-cluster consistency score for the predictive entity, and (iv) b is an aggregation function.

In some embodiments, step/operation 404 may be performed in accordance with the process that is depicted in FIG. 7, which is an example process for generating a cross-cluster consistency score for a predictive entity. The process that is depicted in FIG. 7 begins at step/operation 701 when the predictive data analysis computing entity 106 generates a recipient-based cross-cluster consistency score for the predictive entity. The recipient-based cross-cluster consistency score may describe a measure of variation of recipient-based within-cluster consistency scores for a set of recipient clusters associated with performance records for the corresponding predictive entity. The measure of variation measure may be determined based at least in part on at least one of a statistical measure of variation, a machine-learning-inferred measure of variation, a measure of variation determined using one or more significance testing operations, and/or the like. In some embodiments, the recipient-based cross-cluster consistency score is a ranged value (e.g., a value in the range [0, 1], a value in the range [0.01, 1.00], and/or the like) that has a negative correlation with the measure of variation of recipient-based within-cluster consistency scores for the corresponding predictive entity, such that the higher the recipient-based cross-cluster consistency score for the target service cluster the noted measure of deviation and vice-versa.

In some embodiments, the recipient-based cross-cluster consistency score for a predictive entity is determined based at least in part on the output of the equation $$CGC_P(PR) = n\big(a_{i=1}^N\big(v_{persona=1}^P CT(i, persona, PR)\big),$$

where: (i) $CGC_P$ (PR) is the recipient-based cross-cluster consistency score for the predictive entity, (ii) CT is a function whose output is determined based at least in part on a central tendency measure (e.g., an average measure) of each performance measure for a particular recipient cluster, (iii) persona is an index variable that iterates over P recipient clusters, (iv) v is a coefficient of variation of an ith performance measure of N performance measures in a particular recipient cluster, (v) a is an aggregation function, and (vi) n is a normalization function. In some of the noted embodiments, the CT(i,persona,PR) factor is determined based at least in part on the output of the equation $$CT(i, persona, PR) = CT_{pat=1}^{A_P}(i, pat, PR),$$

where pat is an index variable whose value iterates over $A_P$ performance records that are an in ith recipient cluster, and where CT is a central-tendency-measure-based function as described above.

At step/operation 702, the predictive data analysis computing entity 106 generates a service-based cross-cluster consistency score for the predictive entity. The service-based cross-cluster consistency score may describe a measure of variation of service-based within-cluster consistency scores for a set of service clusters associated with performance records for the corresponding predictive entity. The measure of variation measure may be determined based at least in part on at least one of a statistical measure of variation, a machine-learning-inferred measure of variation, a measure of variation determined using one or more significance testing operations, and/or the like. In some embodiments, the service-based cross-cluster consistency score is a ranged value (e.g., a value in the range [0, 1], a value in the range [0.01, 1.00], and/or the like) that has a negative correlation with the measure of variation of service-based within-cluster consistency scores for the corresponding predictive entity, such that the higher the service-based cross-cluster consistency score for the target service cluster the noted measure of deviation and vice-versa.

In some embodiments, the service-based cross-cluster consistency score for a predictive entity is determined based at least in part on the output of the equation $$CGC_C(PR) = n\big(a_{i=1}^N\big(v_{chiefcomp=1}^C CT(i, chiefcomp, PR)\big),$$

where: (i) $CGC_C$(PR) is the service-based cross-cluster consistency score for the predictive entity, (ii) CT is a function whose output is determined based at least in part on a central tendency measure (e.g., an average measure) performance measures for a particular service cluster, (iii) chiefcomp is an index variable that iterates over C service clusters, (iv) v is a coefficient of variation of an ith performance measure of N performance measures in a particular service cluster, (v) a is an aggregation function, and (vi) n is a normalization function. In some of the noted embodiments, the T(i,chiefcomp,PR) factor is determined based at least in part on the output of the equation $$CT(i, chiefcomp, PR) = CT_{pat=1}^{A_C}(i, pat, PR),$$

where pat is an index variable whose value iterates over $A_C$ performance records that are an in ith service cluster, and where CT is a central-tendency-measure-based function as described above.

At step/operation 703, the predictive data analysis computing entity determines the cross-cluster consistency score based at least in part on the service-based cross-cluster consistency score and the recipient-based cross-cluster consistency score. In some embodiments, the cross-cluster consistency score for a predictive entity is determined based at least in part on the output of the equation CGC=n(b(CGC$_P$ (PR), CGC$_C$(PR))), where: (i) CGC is the cross-cluster consistency score, (ii) CGC$_C$(PR) is the recipient-based cross-cluster consistency score for the predictive entity, (iii) CGC$_C$(PR) is the service-based cross-cluster consistency score for the predictive entity, (iv) b is an aggregation function, and (v) n is a normalization function.

In some embodiments, by using cross-cluster consistency scores, various embodiments of the present invention enable integrating predictive insights from two or more clustering schemes to generate integrative predictive outputs (e.g., integrative predicted scores). The disclosed techniques enable dividing a group of predictive input objects (e.g., a group of performance records) using two sets of clustering operations, such that each predictive input object is associated with a first cluster of a first clustering scheme and a second cluster of a second clustering scheme. This avoids the need for consolidating the features needed to perform each of the two clustering operation sets in order to create an overall clustering space that may have an excessive number of dimensions and eventually produce a suboptimal number of high-quality clusterings. Since the sparsity and multi-dimensionality of clustering spaces is a major challenge facing effective and efficient clustering operations, by disclosing techniques for integrating predictive insights from two or more clustering schemes to generate integrative predictive outputs, various embodiments of the present invention improve effectiveness and efficiency of various predictive data analysis operations that involve clustering of predictive input objects. In doing so, various embodiments of the present invention make important technical contributions to the fields of predictive data analysis and machine learning.

Returning to FIG. 4, at step/operation 405, the predictive data analysis computing entity 106 determines a cross-temporal consistency score for the predictive entity. In some embodiments, the cross-temporal consistency score describes one or more trends associated with consistency scores (e.g., recipient-based within-cluster consistency scores, service-based within-cluster consistency scores, recipient-based cross-cluster consistency scores, service-based cross-cluster consistency scores, and/or the like) of a set of time units associated with performance records of a corresponding predictive entity. In some embodiments, each performance record for a predictive entity is associated with a time unit of a set of time units (e.g., a sequence of time units), each time unit is associated with a temporal consistency score set, and the cross-temporal consistency score for the predictive entity that is determined based at least in part on a variation measure determined based at least in part on each temporal consistency score set.

In some embodiments, the temporal consistency score set for a particular timestep includes at least one of: (i) a per-time-unit service-based within-cluster consistency score for the time unit that is determined based at least in part on a plurality of per-time-unit service clusters for a subset of the plurality of performance records that is associated with the particular time unit (i.e., a subset including performance records whose corresponding timestamps fall within the particular time unit), (ii) a per-time-unit recipient-based within-cluster consistency score for the time unit that is determined based at least in part on a plurality of per-time-unit recipient clusters for a subset of the plurality of performance records that is associated with the particular time unit, (iii) a per-time-unit service-based cross-cluster consistency score for the time unit that is determined based at least in part on a plurality of per-time-unit service clusters for a subset of the plurality of performance records that is associated with the particular time unit, and (iv) a per-time-unit recipient-based cross-cluster consistency score for the time unit that is determined based at least in part on a plurality of per-time-unit recipient clusters for a subset of the plurality of performance records that is associated with the particular time unit.

In some embodiments, the per-time-unit service-based within-cluster consistency score for a particular time unit is determined based at least in part on the techniques described herein with reference to FIG. 5 for determining a service-based within-cluster consistency score, except that the set of performance records used to determine the service-based within-cluster consistency score only include those performance records of a predictive entity that are associated with the particular time unit. Similarly, in some embodiments, the per-time-unit recipient-based within-cluster consistency score for a particular time unit is determined based at least in part on the techniques described herein with reference to FIG. 7 for determining a recipient-based within-cluster consistency score, except that the set of performance records used to determine the recipient-based within-cluster consistency score only include those performance records of a predictive entity that are associated with the particular time unit.

In some embodiments, the per-time-unit recipient-based cross-cluster consistency score for a particular time unit is determined based at least in part on the techniques described herein with reference to step/operation 701 of FIG. 7 for determining a recipient-based cross-cluster consistency score for a predictive entity, except that the set of performance records used to determine the recipient-based cross-cluster consistency score only include those performance records of a predictive entity that are associated with the particular time unit. Similarly, in some embodiments, the per-time-unit service-based cross-cluster consistency score for a particular time unit is determined based at least in part on the techniques described herein with reference to step/operation 702 of FIG. 7 for determining a service-based cross-cluster consistency score for a predictive entity, except that the set of performance records used to determine the service-based cross-cluster consistency score only include those performance records of a predictive entity that are associated with the particular time unit.

In some embodiments, given a sequence of T timesteps having corresponding T inputs vectors determined based at least in part on corresponding T temporal consistency score sets, the T input vectors are processed using T operational timesteps of a recurrent neural network machine learning model (e.g., a conventional recurrent neural network machine learning model, a gated recurrent unit recurrent neural network machine learning model, a long short term memory recurrent neural network machine learning model, a stacked recurrent neural network machine learning model, and/or the like). In some embodiments, during each operational timestep, the recurrent neural network machine learning model is configured to process an input vector for the operational timestep and a preceding hidden state vector for the timestep to generate an updated hidden state vector for the operational timestep. In some embodiments, the preceding hidden state vector for an initial operational timestep is a default hidden state vector (e.g., an all zero hidden state vector). In some embodiments, the preceding hidden state vector for each non-initial operational timestep is the updated hidden state vector for a preceding operational timestep (e.g., the preceding hidden state vector for an ith operational timestep is the updated hidden state vector for the (i−1)th operational timestep). In some embodiments, the cross-temporal consistency score is determined based at least in part on the updated hidden state for a final operational timestep. In some embodiments, the recurrent neural network used to process the temporal consistency score set to generate the cross-temporal consistency score is trained based at least in part on a set of training entries, where each training entry includes a sequences of temporal consistency score set determined for a particular predictive entity (e.g., a particular provider) over time and a ground-truth consistency score for the particular predictive entity that is determined based at least in part on user-provided ratings of the particular predictive entities (e.g., based at least in part on a trend of user-provided ratings of a particular provider).

In some embodiments, the input vector for a particular operational timestep that is associated with a corresponding temporal consistency score set is a vector that includes vector at least one of a value determined based at least in part on the per-time-unit service-based within-cluster consistency score for a particular time unit, a value determined based at least in part on the per-time-unit recipient-based within-cluster consistency score for the particular time unit, a value determined based at least in part on the per-time-unit recipient-based cross-cluster consistency score for the particular time unit, and a value determined based at least in part on the per-time-unit service-based cross-cluster consistency score for the particular time unit. In some embodiments, given a sequence of T time units where each ith time unit is associated with an ith per-time-unit service-based within-cluster consistency score of a sequence of T per-time-unit service-based within-cluster consistency scores, an ith per-time-unit recipient-based within-cluster consistency score of a sequence of T per-time-unit recipient-based within-cluster consistency scores, an ith per-time-unit service-based cross-cluster consistency score of a sequence of T per-time-unit service-based cross-cluster consistency scores, and an ith per-time-unit recipient-based cross-cluster consistency score of a sequence of T per-time-unit recipient-based cross-cluster consistency scores, the input vector for the ith timestep includes at least one of the following values: (i) a value that is determined based at least in part on a trend component of a timeseries data object associated with the sequence of T per-time-unit service-based within-cluster consistency scores at a time point associated with the ith per-time-unit service-based within-cluster consistency score, a seasonality component of a timeseries data object associated with the sequence of T per-time-unit service-based within-cluster consistency scores at a time point associated with the ith per-time-unit service-based within-cluster consistency score, and an error component of a timeseries data object associated with the sequence of T per-time-unit service-based within-cluster consistency scores at a time point associated with the ith per-time-unit service-based within-cluster consistency score, (ii) a value that is determined based at least in part on a trend component of a timeseries data object associated with the sequence of T per-time-unit recipient-based within-cluster consistency scores at a time point associated with the ith per-time-unit recipient-based within-cluster consistency score, a seasonality component of a timeseries data object associated with the sequence of T per-time-unit recipient-based within-cluster consistency scores at a time point associated with the ith per-time-unit recipient-based within-cluster consistency score, and an error component of a timeseries data object associated with the sequence of T per-time-unit recipient-based within-cluster consistency scores at a time point associated with the ith per-time-unit recipient-based within-cluster consistency score, (iii) a value that is determined based at least in part on a trend component of a timeseries data object associated with the sequence of T per-time-unit service-based cross-cluster consistency scores at a time point associated with the ith per-time-unit service-based cross-cluster consistency score, a seasonality component of a timeseries data object associated with the sequence of T per-time-unit service-based cross-cluster consistency scores at a time point associated with the ith per-time-unit service-based cross-cluster consistency score, and an error component of a timeseries data object associated with the sequence of T per-time-unit service-based cross-cluster consistency scores at a time point associated with the ith per-time-unit service-based cross-cluster consistency score, and (iv) a value that is determined based at least in part on a trend component of a timeseries data object associated with the sequence of T per-time-unit recipient-based cross-cluster consistency scores at a time point associated with the ith per-time-unit recipient-based cross-cluster consistency score, a seasonality component of a timeseries data object associated with the sequence of T per-time-unit recipient-based cross-cluster consistency scores at a time point associated with the ith per-time-unit recipient-based cross-cluster consistency score, and an error component of a timeseries data object associated with the sequence of T per-time-unit recipient-based cross-cluster consistency scores at a time point associated with the ith per-time-unit recipient-based cross-cluster consistency score.

In some embodiments, the cross-temporal consistency score for a particular predictive entity is determined based at least in part on the output of the equation DCT(PR)=(DCT$(FC_C)$, DCT$(WGC_P)$,DCT(CGC)), where: (i) DCT (PR) is the cross-temporal consistency score for the predictive entity, (ii) DCT$(FC_C)$ is a trend of per-time-unit service-based within-cluster consistency scores across a set of time units, (iii) DCT$(WGC_P)$ is a trend of per-time-unit recipient-based within-cluster consistency scores across the set of time units, (iv) DCT(CGC) is a trend of per-time-unit cross-cluster consistency scores across the set of time units that is determined based at least in part on at least one of a trend of per-time-unit service-based cross-cluster consistency scores across the set of time units and a trend of per-time-unit recipient-based cross-cluster consistency scores across the set of time units, and (v) z is an aggregation function. In some embodiments, the DCT$(FC_C)$ factor is determined based at least in part on the output of the equation $$DCT(FC_C) = \mathrm{n}(\mathrm{trend}_{t=1}^{T}(FC_C(t))),$$

where: (i) trend is a statistical trend generation function, (ii) t iterates over the T time units of the set of time units discussed above, (iii) $FC_C(t)$ is the per-time-unit service-based within-cluster consistency score for a tth time unit, and (iv) n is a normalization function (e.g., to convert the output of the trend function to a [0, 1] scale and/or to ensure negative correlation between trend and consistency measures). In some embodiments, the DCT$(WGC_P)$ factor is determined based at least in part on the output of the equation $$DCT(WGC_P) = \mathrm{n}(\mathrm{trend}_{t=1}^{T}(WGC_P(t))),$$

where: (i) trend is a statistical trend generation function, (ii) t iterates over the T time units of the set of time units discussed above, (iii) $WGC_P(t)$ is the per-time-unit recipient-based within-cluster consistency score for a tth time unit, and (iv) n is a normalization function. In some embodiments, the DCT(CGC) factor is determined based at least in part on the output of the equation $$DCT(CGC) = \mathrm{trend}_{t=1}^{T}(CGC(t)),$$

where: (i) trend is a statistical trend generation function, (ii) t iterates over the T time units of the set of time units discussed above, and (iii) CGC is the per-time-unit cross-cluster consistency score for a tth time unit that may be determined based at least in part on the per-time-unit service-based cross-cluster consistency score for the tth time unit and/or the per-time-unit recipient-based cross-cluster consistency score for the tth time unit. In some embodiments, each time unit is a month, and T includes a sequence of consecutive months (e.g., 6 months, 36 months, and/or the like).

In some embodiments, by using cross-temporal consistency scores in addition to within-cluster consistency scores and cross-cluster consistency scores, various embodiments of the present invention enable integrating predictive insights from two or more clustering schemes to generate integrative predictive outputs (e.g., integrative predicted scores) based at least in part on predictive input objects that may have a temporal distribution, such that each predictive input object may be associated with a time unit in a sequence of time units that may be distinct from the time unit of another predictive input objects. Because predictive input objects associated with distinct time units may be associated with distinct feature sets and/or distinct feature value distributions imposed by contextual and operational conditions of the distinct time units, temporal variations cause substantial challenges for performing effective and efficient clustering operations. Various embodiments of the present invention address the noted challenges by introducing techniques for generating cross-temporal consistency scores based at least in part on per-time-unit clustering-scheme-specific within-cluster consistency scores and/or per-time-unit clustering-scheme-specific cross-cluster consistency scores. By disclosing the noted techniques, various embodiments of the present invention improve effectiveness and efficiency of various predictive data analysis operations that involve clustering of predictive input objects given temporal variations of the input space for the clustering operations. In doing so, various embodiments of the present invention make further important technical contributions to the fields of predictive data analysis and machine learning.

At step/operation 406, the predictive data analysis computing entity 106 determines the integrative predicted score for the predictive entity based at least in part on the service-based within-cluster consistency score for the predictive entity, the recipient-based within-cluster consistency score for the predictive entity, and the cross-cluster consistency score for the predictive entity. In some embodiments, to generate the integrative predicted score for a predictive entity, the predictive data analysis computing entity 106: (i) combines the service-based within-cluster consistency score for the predictive entity, the recipient-based within-cluster consistency score for the predictive entity, and the cross-cluster consistency score for the predictive entity to generate an exhaustive consistency quotient for the predictive entity, and (ii) combines the exhaustive consistency quotient for the predictive entity with an all-population performance score for the predictive entity and a micro-level benchmark score for the predictive entity to generate the integrative score. In some embodiments, the all-population performance score for the predictive entity describes a performance measurement for past performance by the predictive entity (e.g., a quality of care measurement for a provider entity) across all service recipients (e.g., across all patients). In some embodiments, the micro-level benchmark score is a performance measurement for past performance by the predictive entity (e.g., a quality of care measurement for a provider entity) across a group of service recipients having a recipient persona (e.g., a patient persona) of the recipient identifier, where the recipient persona of the recipient identifier may be determined based at least in part on one or more of recorded behavioral traits of the recipient identifier, demographic markers of the recipient identifier, feature data related to historical clinical encounters of the recipient identifier, feature data related to historical clinical encounters of a set of recipient identifiers that are deemed to be similar to the recipient identifier, and/or the like.

In some embodiments, the exhaustive consistency quotient is a consistency score for a predictive entity that describes recorded performance measurement consistency of the predictive entity across one or more clustering schemes and/or across time. In some embodiments, the exhaustive consistency quotient for a predictive entity PR is determined based at least in part on the output of the equation $ECQ(PR)=y(FC_C(PR),WGC_P(PR),CGC(PR),DCT(PR))$, where:

(i) ECQ(PR) is the exhaustive consistency quotient for the predictive entity PR, (ii) $FC_C(PR)$ is the service-based within-cluster consistency score for the predictive entity PR, (iii) $WGC_P(PR)$ is the recipient-based within-cluster consistency score for the predictive entity PR, (iv) CGC (PR) is the cross-cluster consistency score for the predictive entity PR, (v) DCT (PR) is a cross-temporal consistency score for the predictive entity PR, and (vi) y is an aggregation function.

In some embodiments, the integrative predicted score for a predictive entity PR is determined based at least in part on the output of the equation CPR (PR, A)=f(APP(PR),MLB (PR),ECQ(PR)), where: (i) CPR(PR,A) is the integrative predicted score for the predictive entity PR, (ii) APP(PR) is the all-population performance score for the predictive entity PR, (iii) ECQ(PR) is the exhaustive consistency quotient for the predictive entity PR, (iv) MLB (PR) is the multi-level benchmark score for the predictive entity PR, and (v) f is an aggregation function. In some embodiments, the APP(PR) factor is determined based at least in part on the output of the equation $$APP(PR) = a_{i=1}^{N}(RM(i, PR)),$$

where: (i) i is an index variable that iterates over N performance measures, (ii) a is an aggregation function, and (iii) RM(i,PR) is the rating of an ith measure for the predictive entity PR, which may be determined based at least in part on the output of the equation $$RM(i, PR) = r\left(CT_{pat=1}^{A}(i, pat, PR)\right)$$

(where CT may be a central tendency generation function, pat iterates over A performance records of the predictive entity PR, and r is a normalization function such as a min-max scalar function that converts input values to an n point scale).

In some embodiments, the MLB(PR) factor as described above is determined based at least in part on the output of the equation $MLB(PR)=x(MLB_P(PR),MLB_C(PR))$, where $MLB_P(PR)$ is a multi-level benchmark score that is determined based at least in part on a recipient persona that is determined based at least in part on a determined recipient cluster for the target recipient identifier of the service scoring request, and $MLB_C(PR)$ is a multi-level benchmark score that is determined based at least in part on a recipient persona that is determined based at least in part on a determined service cluster for the target service identifier of the service scoring request. In some embodiments, $MLB_P$ (PR) is determined based at least in part on the output of the equation $$MLB_P(PR) = a_{i=1}^{N}(RM(i, P, PR)),$$

where: (i) i is an index variable that iterates over N performance measures, (ii) a is an aggregation function, and (iii) RM(i,P,PR) is the rating of an ith measure for the predictive entity PR with respect to Pth recipient persona, which may be determined based at least in part on the output of the equation $$RM(i, P, PR) = r\left(CT_{pat=1}^{AP}(i, pat, PR)\right)$$

(where CT may be a central tendency generation function, pat iterates over $A_P$ performance records of the predictive entity PR that are associated with the Pth recipient persona, and r is a normalization function such as a min-max scalar function that converts input values to an n point scale such as a five point scale). In some embodiments, $MLB_C(PR)$ is determined based at least in part on the output of the equation $$MLB_C(PR) = a_{i=1}^N(RM(i, C, PR)),$$

where: (i) i is an index variable that iterates over N performance measures, (ii) a is an aggregation function, and (iii) RM(i,C,PR) is the rating of an ith measure for the predictive entity PR with respect to Cth recipient persona, which may be determined based at least in part on the output of the equation $$RM(i, C, PR) = r\left(CT_{pat=1}^{A_C}(i, pat, PR)\right)$$

(where CT may be a central tendency generation function, pat iterates over $A_C$ performance records of the predictive entity PR that are associated with the Cth recipient persona, and r is a normalization function such as a min-max scalar function that converts input values to an n point scale).

At step/operation 407, the predictive data analysis computing entity 106 performs one or more prediction-based actions based at least in part on the integrative predicted score. Examples of prediction-based actions include generating user interface data for a prediction user interface that describes one or more integrative scores for a particular predictive entity and/or one or more intermediate values used to generate the integrative score, and providing the user interface data for display using a client computing entity. An operational example of such a prediction output user interface 800 is depicted in FIG. 8. As depicted in FIG. 8, the prediction output user interface 800 display the following data for the provider identifier 801: (i) the integrative predicted score 811, (ii) the multi-level benchmark score 812, (iii) the current exhaustive consistency quotient 813, (iv) the all-population performance score 814, and (v) a set of historic current exhaustive consistency quotients 815 for five historic time units along with, for each historic time unit, a per-time-unit service-based within-cluster consistency score (FC), a per-time-unit recipient-based within-cluster consistency score (WGC), a per-time-unit cross-cluster consistency score (CGC), and a cross-temporal consistency score (DCT).

Other examples of prediction-based actions include generating user interface data for a prediction user interface that describes a ranking of one or more recommended predictive entities in response to an incoming service request, where: (i) the one or more recommended predictive entities provide the services associated with the service identifier of the incoming service request and/or satisfy one or more criteria associated with the recipient identifier of the incoming service request, and (ii) the ranking is determined based at least in part on the integrative predicted scores of the recommended predictive entities. An operational example of such a prediction output user interface 900 is depicted in FIG. 9. As depicted in FIG. 9, each recommended provider identifier is within a predefined geographic location of the patient identifier associated with a corresponding incoming service request, and the ranking is performed based at least in part on integrative predicted scores of the recommended provider identifiers, such that the recommended provider identifier 901 has a higher integrative predicted score relative to the provider identifier 902.

Other examples of prediction-based actions include automatically scheduling medical appointments corresponding to a clinical intervention recommendation that is determined based at least in part on the integrative predicted scores for a set of predictive entities and/or automatically transmitting medication/treatment requests corresponding to the clinical intervention recommendation. In some embodiments, performing prediction-based actions includes generating user interface data for a prediction output user interface that is configured to display a sequence of recommended clinical interventions along with future clinical states that are predicted to result from performing the sequence of recommended clinical interventions.

In some embodiments, the predictive data analysis computing entity 106 may determine a predictive output based at least in part on a hybrid prediction score for a patient identifier with respect to each medication/treatment regimen that describes success ratios for the medication/treatment regimen in a determined decision subset of the patient identifier, where the hybrid prediction score is determined based at least in part on the integrative predicted scores for a set of predictive entities. The predictive data analysis computing entity 106 may then perform prediction-based actions based at least in part on a medication/treatment regimen having a highest predictive output (i.e., a highest success ratio). Examples of prediction-based actions include automatic prescription filling operations and/or scheduling automatic consultation sessions to discuss the medication/treatment regimen having the highest predictive output. Other examples of prediction-based actions include automatically transmitting notifications to a computing device of the patient identifier to recommend the medication/treatment regimen having the highest predictive output.

Accordingly, various embodiments of the present invention enable integrating predictive insights from two or more clustering schemes to generate integrative predictive outputs (e.g., integrative predicted scores). The disclosed techniques enable dividing a group of predictive input objects (e.g., a group of performance records) using two sets of clustering operations, such that each predictive input object is associated with a first cluster of a first clustering scheme and a second cluster of a second clustering scheme. This avoids the need for consolidating the features needed to perform each of the two clustering operation sets in order to create an overall clustering space that may have an excessive number of dimensions and eventually produce a suboptimal number of high-quality clusterings. Since the sparsity and multi-dimensionality of clustering spaces is a major challenge facing effective and efficient clustering operations, by disclosing techniques for integrating predictive insights from two or more clustering schemes to generate integrative predictive outputs, various embodiments of the present invention improve effectiveness and efficiency of various predictive data analysis operations that involve clustering of predictive input objects. In doing so, various embodiments of the present invention make important technical contributions to the fields of predictive data analysis and machine learning.

Moreover, various embodiments of the present invention enable integrating predictive insights from two or more clustering schemes to generate integrative predictive outputs (e.g., integrative predicted scores) based at least in part on predictive input objects that may have a temporal distribution, such that each predictive input object may be associated with a time unit in a sequence of time units that may be distinct from the time unit of another predictive input objects. Because predictive input objects associated with distinct time units may be associated with distinct feature sets and/or distinct feature value distributions imposed by contextual and operational conditions of the distinct time units, temporal variations cause substantial challenges for performing effective and efficient clustering operations. Various embodiments of the present invention address the noted challenges by introducing techniques for generating cross-temporal consistency scores based at least in part on per-time-unit clustering-scheme-specific within-cluster consistency scores and/or per-time-unit clustering-scheme-specific cross-cluster consistency scores. By disclosing the noted techniques, various embodiments of the present invention improve effectiveness and efficiency of various predictive data analysis operations that involve clustering of predictive input objects given temporal variations of the input space for the clustering operations. In doing so, various embodiments of the present invention make further important technical contributions to the fields of predictive data analysis and machine learning.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

generating, by one or more processors and using a machine learning model, an integrative predicted score for a predictive entity according to a first clustering scheme and a second clustering scheme, wherein (i) the predictive entity is associated with a plurality of performance records, (ii) the first clustering scheme and the second clustering scheme comprise different clustering schemes, (iii) the machine learning model is trained based at least in part on a set of training entries, (iv) a training entry of the set of training entries comprises (a) a sequence of temporal consistency score set and (b) a ground-truth consistency score determined based at least in part on a set of user-provided ratings, and (v) determining the integrative predicted score comprises:

generating a plurality of first clusters, comprising the plurality of performance records, according to the first clustering scheme and a plurality of second clusters, comprising the plurality of performance records, according to the second clustering scheme for the predictive entity, determining a plurality of performance measures corresponding to the plurality of performance records, determining a plurality of first cluster variation measures corresponding to the plurality of first clusters, wherein a first cluster variation measure of the plurality of first cluster variation measures is associated with a first cluster of the plurality of first clusters and determined based at least in part on a variation of a performance measure associated with the first cluster, determining a plurality of second cluster variation measures corresponding to the plurality of second clusters, wherein a second cluster variation measure of the plurality of second cluster variation measures is associated with a second cluster of the plurality of second clusters and determined based at least in part on a variation of a performance measure associated with the second cluster, determining, based at least in part on the first cluster variation measure for a target first cluster of the plurality of first clusters, a first within-cluster consistency score, determining, based at least in part on the second cluster variation measure for a target second cluster of the plurality of second clusters, a second within-cluster consistency score, determining a first cross-cluster consistency score based at least in part on a first variation of the plurality of first cluster variation measures, determining a second cross-cluster consistency score based at least in part on a second variation of the plurality of second cluster variation measures, and determining the integrative predicted score based at least in part on (i) the first within-cluster consistency score, (ii) the second within-cluster consistency score, (iii) the first cross-cluster consistency score, and (iv) the second cross-cluster consistency score; and initiating, by the one or more processors, one or more prediction-based actions based at least in part on the integrative predicted score.

2. The computer-implemented method of claim 1, wherein:

a performance record of the plurality of performance records is associated with a first identifier of a plurality of first identifiers and a second identifier of a plurality of second identifiers, generating the first clustering scheme comprises: (i) generating a plurality of first embeddings corresponding to the plurality of first identifiers, and (ii) generating the plurality of first clusters based at least in part on distances across the plurality of first embeddings, and generating the second clustering scheme comprises: (i) generating a plurality of second embeddings corresponding to the plurality of second identifiers, and (ii) generating the plurality of second clusters based at least in part on distances across the plurality of second embeddings.

3. The computer-implemented method of claim 2, wherein:

the performance record is associated with a time unit of a sequence of time units, the time unit is associated with a temporal consistency score set of a plurality of temporal consistency score sets, and the integrative predicted score is determined based at least in part on a cross-temporal consistency score that is determined based at least in part on a variation of the plurality of temporal consistency score sets.

4. The computer-implemented method of claim 3, wherein a temporal consistency score set for a particular time unit comprises a per-time-unit service-based within-cluster consistency score for the time unit that is determined based at least in part on a plurality of per-time-unit service clusters for a subset of the plurality of performance records that is associated with the time unit.

5. The computer-implemented method of claim 3, wherein a temporal consistency score set for a particular time unit comprises a per-time-unit recipient-based within-cluster consistency score for the time unit that is determined based at least in part on a plurality of per-time-unit recipient clusters for a subset of the plurality of performance records that is associated with the time unit.

6. The computer-implemented method of claim 3, wherein a temporal consistency score set for a particular time unit comprises a per-time-unit service-based cross-cluster consistency score for the time unit that is determined based at least in part on a plurality of per-time-unit service clusters for a subset of the plurality of performance records that is associated with the time unit.

7. The computer-implemented method of claim 3, wherein a temporal consistency score set for a particular time unit comprises a per-time-unit recipient-based cross-cluster consistency score for the time unit that is determined based at least in part on a plurality of per-time-unit recipient clusters for a subset of the plurality of performance records that is associated with the time unit.

8. The computer-implemented method of claim 3, wherein determining the cross-temporal consistency score comprises:

during an operational timestep of a sequence of operational timesteps, processing per-timestep input data determined based at least in part on a temporal consistency score set for a corresponding time unit and a preceding hidden state using a recurrent neural network machine learning model to determine an updated hidden state, and determining the cross-temporal consistency score based at least in part on the updated hidden state for a final operational timestep.

9. The computer-implemented method of claim 1, wherein determining the integrative predicted score comprises:

determining, based at least in part on the first cross-cluster consistency score and the second cross-cluster consistency score, a cross-cluster consistency score for the predictive entity, and determining the integrative predicted score based at least in part on the first within-cluster consistency score, the second within-cluster consistency score, and the cross-cluster consistency score.

10. A system comprising:

one or more processors; and at least one memory storing processor-executable instructions that, when executed by any one or more of the one or more processors, causes the one or more processors to perform operations comprising:

generate, using a machine learning model, an integrative predicted score for a predictive entity according to a first clustering scheme and a second clustering scheme, wherein (i) the predictive entity is associated with a plurality of performance records, (ii) the first clustering scheme and the second clustering scheme comprise different clustering schemes, (iii) the machine learning model is trained based at least in part on a set of training entries, (iv) a training entry of the set of training entries comprises (a) a sequence of temporal consistency score set and (b) a ground-truth consistency score determined based at least in part on a set of user-provided ratings, and (v) determining the integrative predicted score comprises:

generating a plurality of first clusters, comprising the plurality of performance records, according to the first clustering scheme and a plurality of second clusters, comprising the plurality of performance records, according to the second clustering scheme for the predictive entity, determining a plurality of performance measures corresponding to the plurality of performance records, determining a plurality of first cluster variation measures corresponding to the plurality of first clusters, wherein a first cluster variation measure of the plurality of first cluster variation measures is associated with a first cluster of the plurality of first clusters and determined based at least in part on a variation of a performance measure associated with the first cluster, determining a plurality of second cluster variation measures corresponding to the plurality of second clusters, wherein a second cluster variation measure of the plurality of second cluster variation measures is associated with a second cluster of the plurality of second clusters and determined based at least in part on a variation of a performance measure associated with the second cluster, determining, based at least in part on the first cluster variation measure for a target first cluster of the plurality of first clusters, a first within-cluster consistency score, determining, based at least in part on the second cluster variation measure for a target second cluster of the plurality of second clusters, a second within-cluster consistency score, determining a first cross-cluster consistency score based at least in part on a first variation of the plurality of first cluster variation measures, determining a second cross-cluster consistency score based at least in part on a second variation of the plurality of second cluster variation measures, and determining the integrative predicted score based at least in part on (i) the first within-cluster consistency score, (ii) the second within-cluster consistency score, (iii) the first cross-cluster consistency score, and (iv) the second cross-cluster consistency score; and initiate one or more prediction-based actions based at least in part on the integrative predicted score.

11. The system of claim 10, wherein:

a performance record of the plurality of performance records is associated with a first identifier of a plurality of first identifiers and a second identifier of a plurality of second identifiers, generating the first clustering scheme comprises: (i) generating a plurality of first embeddings corresponding to the plurality of first identifiers, and (ii) generating the plurality of first clusters based at least in part on distances across the plurality of first embeddings, and generating the second clustering scheme comprises: (i) generating a plurality of second embeddings corresponding to the plurality of second identifiers, and (ii) generating the plurality of second clusters based at least in part on distances across the plurality of second embeddings.

12. The system of claim 11, wherein:

the performance record is associated with a time unit of a sequence of time units, the time unit is associated with a temporal consistency score set of a plurality of temporal consistency score sets, and the integrative predicted score is determined based at least in part on a cross-temporal consistency score that is determined based at least in part on a variation of the plurality of temporal consistency score sets.

13. The system of claim 12, wherein a temporal consistency score set for a particular time unit comprises a per-time-unit service-based within-cluster consistency score for the time unit that is determined based at least in part on a plurality of per-time-unit service clusters for a subset of the plurality of performance records that is associated with the time unit.

14. The system of claim 12, wherein a temporal consistency score set for a particular time unit comprises a per-time-unit recipient-based within-cluster consistency score for the time unit that is determined based at least in part on a plurality of per-time-unit recipient clusters for a subset of the plurality of performance records that is associated with the time unit.

15. The system of claim 12, wherein a temporal consistency score set for a particular time unit comprises a per-time-unit service-based cross-cluster consistency score for the time unit that is determined based at least in part on a plurality of per-time-unit service clusters for a subset of the plurality of performance records that is associated with the time unit.

16. The system of claim 12, wherein a temporal consistency score set for a particular time unit comprises a per-time-unit recipient-based cross-cluster consistency score for the time unit that is determined based at least in part on a plurality of per-time-unit recipient clusters for a subset of the plurality of performance records that is associated with the time unit.

17. The system of claim 12, wherein determining the cross-temporal consistency score comprises:

during an operational timestep of a sequence of operational timesteps, processing per-timestep input data determined based at least in part on a temporal consistency score set for a corresponding time unit and a preceding hidden state using a recurrent neural network machine learning model to determine an updated hidden state, and determining the cross-temporal consistency score based at least in part on the updated hidden state for a final operational timestep.

18. The system of claim 10, wherein determining the integrative predicted score comprises:

determining, based at least in part on the first cross-cluster consistency score and the second cross-cluster consistency score, a cross-cluster consistency score for the predictive entity, and determining the integrative predicted score based at least in part on the first within-cluster consistency score, the second within-cluster consistency score, and the cross-cluster consistency score.

19. One or more non-transitory computer-readable storage media including instructions that, when executed by one or more processors, cause the one or more processors to:

generate, using a machine learning model, an integrative predicted score for a predictive entity according to a first clustering scheme and a second clustering scheme, wherein (i) the predictive entity is associated with a plurality of performance records, (ii) the first clustering scheme and the second clustering scheme comprise different clustering schemes, (iii) the machine learning model is trained based at least in part on a set of training entries, (iv) a training entry of the set of training entries comprises (a) a sequence of temporal consistency score set and (b) a ground-truth consistency score determined based at least in part on a set of user-provided ratings, and (v) determining the integrative predicted score comprises:

generating a plurality of first clusters, comprising the plurality of performance records, according to the first clustering scheme and a plurality of second clusters, comprising the plurality of performance records, according to the second clustering scheme for the predictive entity, determining a plurality of performance measures corresponding to the plurality of performance records, determining a plurality of first cluster variation measures corresponding to the plurality of first clusters, wherein a first cluster variation measure of the plurality of first cluster variation measures is associated with a first cluster of the plurality of first clusters and determined based at least in part on a variation of a performance measure associated with the first cluster, determining a plurality of second cluster variation measures corresponding to the plurality of second clusters, wherein a second cluster variation measure of the plurality of second cluster variation measures is associated with a second cluster of the plurality of second clusters and determined based at least in part on a variation of a performance measure associated with the second cluster, determining, based at least in part on the first cluster variation measure for a target first cluster of the plurality of first clusters, a first within-cluster consistency score, determining, based at least in part on the second cluster variation measure for a target second cluster of the plurality of second clusters, a second within-cluster consistency score, determining a first cross-cluster consistency score based at least in part on a first variation of the plurality of first cluster variation measures, determining a second cross-cluster consistency score based at least in part on a second variation of the plurality of second cluster variation measures, and determining the integrative predicted score based at least in part on (i) the first within-cluster consistency score, (ii) the second within-cluster consistency score, (iii) the first cross-cluster consistency score, and (iv) the second cross-cluster consistency score; and initiate one or more prediction-based actions based at least in part on the integrative predicted score.

20. The one or more non-transitory computer-readable storage media of claim 19, wherein:

a performance record of the plurality of performance records is associated with a first identifier of a plurality of first identifiers and a second identifier of a plurality of second identifiers, generating the first clustering scheme comprises: (i) generating a plurality of first embeddings corresponding to the plurality of first identifiers, and (ii) generating the plurality of first clusters based at least in part on distances across the plurality of first embeddings, and generating the second clustering scheme comprises: (i) generating a plurality of second embeddings corresponding to the plurality of second identifiers, and (ii)

generating the plurality of second clusters based at least in part on distances across the plurality of second embeddings.

* * * * *